US012399738B2

(12) United States Patent
Sodagar

(10) Patent No.: US 12,399,738 B2
(45) Date of Patent: *Aug. 26, 2025

(54) METHOD AND APPARATUS FOR A STEP-ENABLED WORKFLOW

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/463,964

(22) Filed: Sep. 8, 2023

(65) Prior Publication Data

US 2023/0418660 A1    Dec. 28, 2023

Related U.S. Application Data

(63) Continuation of application No. 17/024,193, filed on Sep. 17, 2020, now Pat. No. 11,789,771.

(Continued)

(51) Int. Cl.
*G06F 9/48* (2006.01)
*G06F 9/54* (2006.01)
(Continued)

(52) U.S. Cl.
CPC ............ *G06F 9/485* (2013.01); *G06F 9/4881* (2013.01); *G06F 9/542* (2013.01); *G06F 9/544* (2013.01);

(Continued)

(58) Field of Classification Search
CPC ........ G06F 9/485; G06F 9/4881; G06F 9/542; G06F 9/544; G06Q 10/06316; G06Q 10/0633; G06Q 10/103
See application file for complete search history.

(56) References Cited

U.S. PATENT DOCUMENTS 7,096,481 B1    8/2006 Forecast et al.
8,804,751 B1 *  8/2014 Poole .................... H04L 49/90
                                                370/413

(Continued)

OTHER PUBLICATIONS

International Search Report and Written Opinion in PCT/US2020/52675, mailed Feb. 2, 2023, 7 pages.

(Continued)

*Primary Examiner* — April Y Blair
*Assistant Examiner* — Jonathan R Labud
(74) *Attorney, Agent, or Firm* — ArentFox Schiff LLP

(57) ABSTRACT

In a method for processing a network-based media processing (NBMP) workflow, workflow information is received. The NBMP workflow to process input data is generated based on the workflow information. The NBMP workflow includes a plurality of media processing tasks and a first buffering task. The plurality of media processing tasks includes a first media processing task and a second media processing task. The first media processing task is set to a running state in which a subset of the input data is processed by the first media processing task and output to the first buffering task as first processed subset data. The first media processing task is set from the running state to a non-running state in response to an amount of the first processed subset data stored in the first buffering task being equal to a first threshold. Further, the second media processing task is set.

20 Claims, 13 Drawing Sheets

Related U.S. Application Data

(60) Provisional application No. 62/907,627, filed on Sep. 28, 2019, provisional application No. 62/907,625, filed on Sep. 28, 2019.

(51) Int. Cl.
  *G06Q 10/0631* (2023.01)
  *G06Q 10/0633* (2023.01)
  *G06Q 10/10* (2023.01)

(52) U.S. Cl.
  CPC ... *G06Q 10/06316* (2013.01); *G06Q 10/0633* (2013.01); *G06Q 10/103* (2013.01)

(56) References Cited

U.S. PATENT DOCUMENTS

| | | |
|---|---|---|
| 9,342,063 B1 | 5/2016 | Iakhnine et al. |
| 2003/0206173 A1 | 11/2003 | Kawai et al. |
| 2006/0117316 A1 | 6/2006 | Cismas et al. |
| 2007/0177677 A1 | 8/2007 | Thomsen |
| 2012/0259946 A1 | 10/2012 | Stockhammer et al. |
| 2013/0007223 A1 | 1/2013 | Luby et al. |
| 2013/0097287 A1 | 4/2013 | Shauh et al. |
| 2014/0074905 A1 | 3/2014 | Schincariol et al. |
| 2016/0043874 A1* | 2/2016 | Chen .............. H04L 12/12 370/431 |
| 2017/0052824 A1 | 2/2017 | Sharma et al. |
| 2017/0060579 A1 | 3/2017 | Vincent et al. |
| 2019/0222621 A1* | 7/2019 | Kolan .............. H04L 67/04 |
| 2020/0125548 A1* | 4/2020 | Shergill ............ G06F 16/254 |
| 2021/0055948 A1 | 2/2021 | Tsirkin et al. |
| 2021/0099403 A1 | 4/2021 | Sodagar |

OTHER PUBLICATIONS

International Search Report in PCT/US2020/52659, mailed Feb. 24, 2021, 2 pages.
ISO/IEC, "Text of ISO/IEC DIS 23090-8 Network-based Media Processing," ISO/IEC JTC 1/SC 29/WG 11, Jul. 12, 2019, Convenorship: UNI (ITaly), 156 pages.

* cited by examiner

METHOD AND APPARATUS FOR A STEP-ENABLED WORKFLOW

INCORPORATION BY REFERENCE

This present application is a continuation application of U.S. application Ser. No. 17/024,193, "METHOD AND APPARATUS FOR A STEP-ENABLED WORKFLOW" filed on Sep. 17, 2020, which claims the benefit of priority to U.S. Provisional Application No. 62/907,627, "STEP-ENABLED STATELESS WORKFLOWS FOR CLOUD COMPUTING" filed on Sep. 28, 2019, and U.S. Provisional Application No. 62/907,625, "INDEXED FIFO FUNCTIONS FOR SEGMENTED PROCESSING IN CLOUD" filed on Sep. 28, 2019, which are incorporated by reference herein in their entirety.

TECHNICAL FIELD

The present disclosure describes embodiments generally related to data processing including processing of one or more workflows.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Workflows can be used in data processing to process data, such as media data, in a data processing system. In some examples, a workflow includes a large number of processing tasks. When the large number of tasks runs in parallel to process data, the data processing system needs to dedicate a large amount of resources.

SUMMARY

Aspects of the disclosure provide methods and an apparatus for processing one or more workflows. The apparatus includes processing circuitry configured to receive workflow information of a workflow. The processing circuitry generates, based on the workflow information, the workflow to process input data. The workflow includes a plurality of processing tasks and a first buffering task. The plurality of processing tasks includes a first processing task and a second processing task. The processing circuitry causes the first processing task to enter a running state in which a subset of the input data is processed by the first processing task and output to the first buffering task as first processed subset data. The processing circuitry causes the first processing task to transition from the running state to a non-running state based on an amount of the first processed subset data stored in the first buffering task being equal to a first threshold. After the first processing task is transitioned to the non-running state, the processing circuitry causes the second processing task to enter a running state in which the first processed subset data stored in the first buffering task is processed by the second processing task.

In an embodiment, the second processing task is configured to output the processed first processed subset data as second processed subset data to a second buffering task in the running state. The processing circuitry causes the second processing task to transition from the running state to a non-running state based on one of: (i) an amount of the second processed subset data stored in the second buffering task being equal to a second threshold and (ii) the amount of the first processed subset data stored in the first buffering task being provided to the second processing task.

In an embodiment, the plurality of processing tasks is configured with respective task segment duration (TSDs). Each of the plurality of processing tasks is configured to process an amount of data having a size equal to the respective TSD independently from data outside the TSD. The processing circuitry determines a workflow segment duration (WSD) to be a least common multiple of the TSDs. The first threshold can be based on one of (i) the TSDs, (ii) the WSD, and (iii) the WSD and a parameter S that indicates a number of steps that the first processing task is configured to run consecutively.

In an embodiment, the first buffering task is an indexed first-in-first-out (iFIFO) task configured with an iFIFO buffer. The iFIFO task is configured to store buffer segments of the input data. Each buffer segment can be indexed with a starting time, a duration, and a length. An iFIFO buffer size can be based on the length and a number of buffer segments in the iFIFO buffer. The iFIFO task is configured to generate an event indicating that the amount of the first processed subset data stored in the iFIFO task is equal to the first threshold. The iFIFO task is configured to generate another event indicating that the amount of the first processed subset data stored in the iFIFO task is provided to the second processing task.

In an embodiment, the first buffering task is a multi-index first-in-first-out (MiFIFO) task configured with a plurality of iFIFO buffers. The MiFIFO task is configured to provide one or more outputs for the first processing task. Each of the plurality of iFIFO buffers can be configured to store buffer segments of the input data from a respective one of the one or more outputs. Each buffer segment can be indexed with a starting time, a duration, and a length. A buffer size of each iFIFO buffer can be based on the length and a number of buffer segments in the respective iFIFO buffer. The MiFIFO task is configured to generate an event indicating that the amount of the first processed subset data stored in the MiFIFO task is equal to the first threshold. The MiFIFO task is configured to generate another event indicating that the amount of the first processed subset data stored in the MiFIFO task is provided to the second processing task.

In an embodiment, no state information of the first processing task is stored when the first processing task is in the non-running state. The non-running state includes one of an idle state and a destroyed state.

In an embodiment, the workflow includes a plurality of buffering tasks that includes the iFIFO task. Each input of the plurality of processing tasks is from one of the input data and one or more of the plurality of buffering tasks, and only one of the plurality of the processing tasks is allowed to be in the running state at any point in time.

In an embodiment, the input data includes the subset of the input data and another subset of the input data. The workflow includes a plurality of buffering tasks that includes the iFIFO task. Each input of the plurality of processing tasks is from one of the input data and one or more of the plurality of buffering tasks. The processing circuitry can sequentially process the subset of the input data by the plurality of processing tasks. After the subset of the input data is processed by the plurality of processing tasks, the processing circuitry sequentially processes the other subset of the input data by the plurality of processing tasks.

Remaining processing tasks in the plurality of processing tasks can be in non-running states. Only one of the plurality of the processing tasks is allowed to be in the running state at any point in time.

In an embodiment, the workflow includes a plurality of buffering tasks that includes the MiFIFO task. Each input of the plurality of processing tasks is from one of the input data and one or more of the plurality of buffering tasks, and only one of the plurality of the processing tasks is allowed to be in the running state at any point in time.

In an embodiment, the input data includes the subset of the input data and another subset of the input data. The workflow includes a plurality of buffering tasks that includes the MiFIFO task. Each input of the plurality of processing tasks is from one of the input data and one or more of the plurality of buffering tasks. The processing circuitry can sequentially process the subset of the input data by the plurality of processing tasks. After the subset of the input data is processed by the plurality of processing tasks, the processing circuitry can sequentially process the other subset of the input data by the plurality of processing tasks. Remaining processing tasks in the plurality of processing tasks can be in non-running states. Only one of the plurality of the processing tasks is allowed to be in the running state at any point in time.

The processing circuitry can be configured to receive workflow information of a plurality of workflows. The processing circuitry generates, based on the workflow information, the plurality of workflows to process input data. At least one of the plurality of workflows includes a plurality of processing tasks. The plurality of workflows includes a first workflow and a second workflow. The processing circuitry causes the first workflow to enter a running state in which a subset of the input data is processed by the first workflow and output to a buffering task as first processed subset data. The processing circuitry causes the first workflow to transition from the running state to a non-running state based on an amount of the first processed subset data stored in the buffering task being equal to a threshold. After the first workflow is transitioned to the non-running state, the processing circuitry causes the second workflow to enter a running state in which the first processed subset data stored in the buffering task is processed by the second workflow.

In an embodiment, the non-running state of the first workflow includes one of an idle state and a destroyed state. No state information of the first workflow is stored when the first workflow is in the non-running state. The first workflow is configured to process the subset of the input data independently from remaining subsets outside the subset of the input data.

In an embodiment, the buffering task is an iFIFO task configured with an iFIFO buffer. The iFIFO task is configured to store buffer segments of the input data. Each buffer segment can be indexed with a starting time, a duration, and a length. An iFIFO buffer size can be based on the length and a number of buffer segments in the iFIFO buffer. The iFIFO task is configured to generate an event indicating that the amount of the first processed subset data stored in the iFIFO task is equal to the threshold. The iFIFO task is configured to generate another event indicating that the amount of the first processed subset data stored in the iFIFO task is provided to the second workflow.

In an embodiment, the buffering task is a MiFIFO task configured with a plurality of iFIFO buffers. The MiFIFO task is configured to provide one or more outputs for the first workflow. Each of the plurality of iFIFO buffers is configured to store buffer segments of the input data from a respective one of the one or more outputs. Each buffer segment is indexed with a starting time, a duration, and a length. A buffer size of each iFIFO buffer can be based on the length and a number of buffer segments in the respective iFIFO buffer. The MiFIFO task is configured to generate an event indicating that the amount of the first processed subset data stored in the MiFIFO task is equal to the threshold. The MiFIFO task is configured to generate another event indicating that the amount of the first processed subset data stored in the MiFIFO task is provided to the second workflow.

Aspects of the disclosure also provide a non-transitory computer-readable medium storing instructions which when executed by a computer cause the computer to perform any of the methods for processing one or more workflows.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
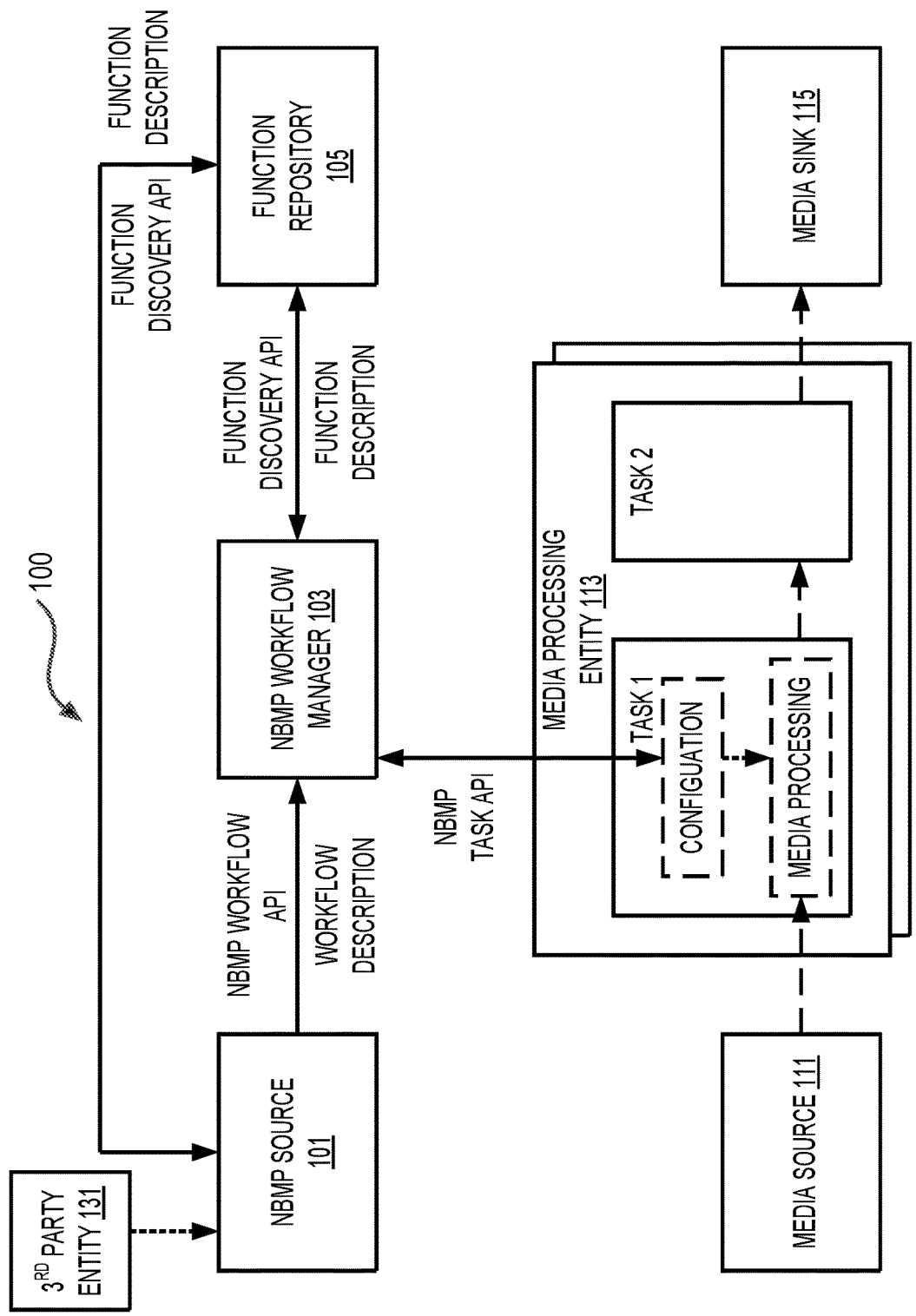
FIG. 1 shows an exemplary data processing system according to an embodiment of the disclosure.

Aspects of the disclosure are related to data processing (e.g., media processing in a network). A data processing source (e.g., a network-based media processing (NBMP) source) can describe a requested data processing (e.g., a requested media processing) and provide control information for data (e.g., media data) to be processed. Accordingly, a workflow manager (e.g., an NBMP workflow manager) can establish a workflow (e.g., a media processing workflow, an NBMP workflow) and can inform the data processing source (e.g., the NBMP source) that the workflow is ready, and thus the data processing can start. Data source(s) (e.g., media source(s)) can then start transmitting the data, for example, to the network for processing.

In general, a workflow can include processing tasks or tasks (e.g., media processing tasks). A connected graph can represent the workflow by using connections to represent input/output relationships among the processing tasks. Thus, the workflow can be considered as the connected graph of the processing tasks. Each task can perform an operation (e.g., media processing operation), such as video decoding, video stitching, video encoding, and/or the like. The workflow manager can ensure correct operation of the workflow by configuring and monitoring each task and a workflow output. The workflow manager can be configured to select processing functions (e.g., media processing functions) and instantiating the processing functions (e.g., the media processing functions) as respective tasks based on a workflow description that, for example, is received from the data processing source (e.g., the NBMP source).

Processing entities (e.g., media processing entities) that are configured to run the processing tasks can be established, loaded, instantiated, and monitored. Interfaces such as application programming interfaces (APIs) can be defined between the data processing source and the workflow manager, the workflow manager and the processing task(s), and an API to discover appropriate function(s). In general, a data processing system or platform (e.g., a NBMP platform) can be data format (e.g., media format) and protocol agnostic. The data processing system can identify and signal the data (e.g., the media data), metadata and auxiliary information formats for data exchanged between a data source (e.g., a media source), the workflow manager, and tasks.

The data processing framework (e.g., the NBMP framework) can define interfaces including both data formats and APIs among various entities connected through digital networks for data processing. Users can access and configure user operations remotely for efficient and intelligent processing. The data can be uploaded, for example, to the network, the processing tasks can be instantiated, and the processing tasks can be further configured. The data processing framework can enable dynamic creation of data processing pipelines (e.g., media processing pipelines), as well as access to processed data and metadata in real-time or in a deferred way. The data and metadata formats used between the data source, the workflow manager, and the data processing entities in a data processing pipeline can be specified.

The data processing framework can enable clients (e.g., creators, service providers, and consumers of digital media) to describe data processing operations to be performed by the data processing entities, for example, in the network. A workflow can be described by composing a set of data processing functions that are accessible through interfaces (e.g., NBMP APIs). A data processing entity (e.g., a media processing entity (MPE)) can run processing tasks applied on the data and the related metadata received from data source(s) or other tasks. The data processing entity (e.g., MPE) can provide capabilities for configuring, managing, and monitoring processing tasks. A data processing task can be a process applied to data and metadata input(s), producing data and related metadata output(s) to be consumed by a data sink (e.g., a media sink) or other data processing tasks (e.g., media processing tasks).

The data processing framework can support various delivery methods such as streaming, file delivery, push-based progressive download, hybrid delivery, multipath, and heterogeneous network environments.

FIG. 1 shows an exemplary data processing system (e.g., NBMP system, a NBMP reference architecture, a NBMP architecture) (100) according to an embodiment of the disclosure. The data processing system (100) can include a plurality of entities, such as a data source (e.g., a NBMP source, a NBMP source entity) (101), a workflow manager (e.g., a NBMP workflow manager) (103), a function repository (105), a data source or a data source entity (e.g., a media source, a media source entity) (111), a data processing entity (e.g., a MPE) (113), a data sink or a data sink entity (e.g., a media sink or a media sink entity) (115), a third party entity, and/or the like. The data processing system (100) can include additional data source(s), data sink(s), and/or data processing entities. The data processing system (100) can process data across one or more processing entities in a network. Information, such as various data and control information (or control data) for the data, can be communicated among the plurality of entities in the data processing system (100).

To provide a context for discussion purposes, the data processing system (100) is described as the NBMP system (100) below. The descriptions can be suitably adapted to any data processing system.

The NBMP source (101) can describe, or otherwise indicate, media processing in the network. The function repository (105) can include NBMP function descriptions of various NBMP functions. The NBMP source (101) and the workflow manager (103) can retrieve the NBMP function descriptions or functions from the function repository (105). An NBMP function can refer to implementation of a stand-alone and self-contained media processing operation and/or the corresponding description of the operation.

A processing task or a task can refer to a runtime instance of a NBMP function that is executed by the MPE (113). An NBMP workflow or a workflow can be represented by a graph (e.g., a directed acyclic graph (DAG)) of one or more connected task(s) that achieve the requested media processing. The workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103), and the MPE (113)) in the NBMP system (100) can use APIs to invoke and respond to media service requests. The APIs can include a NBMP workflow API or a workflow API, a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., RetrieveWorkflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2A:
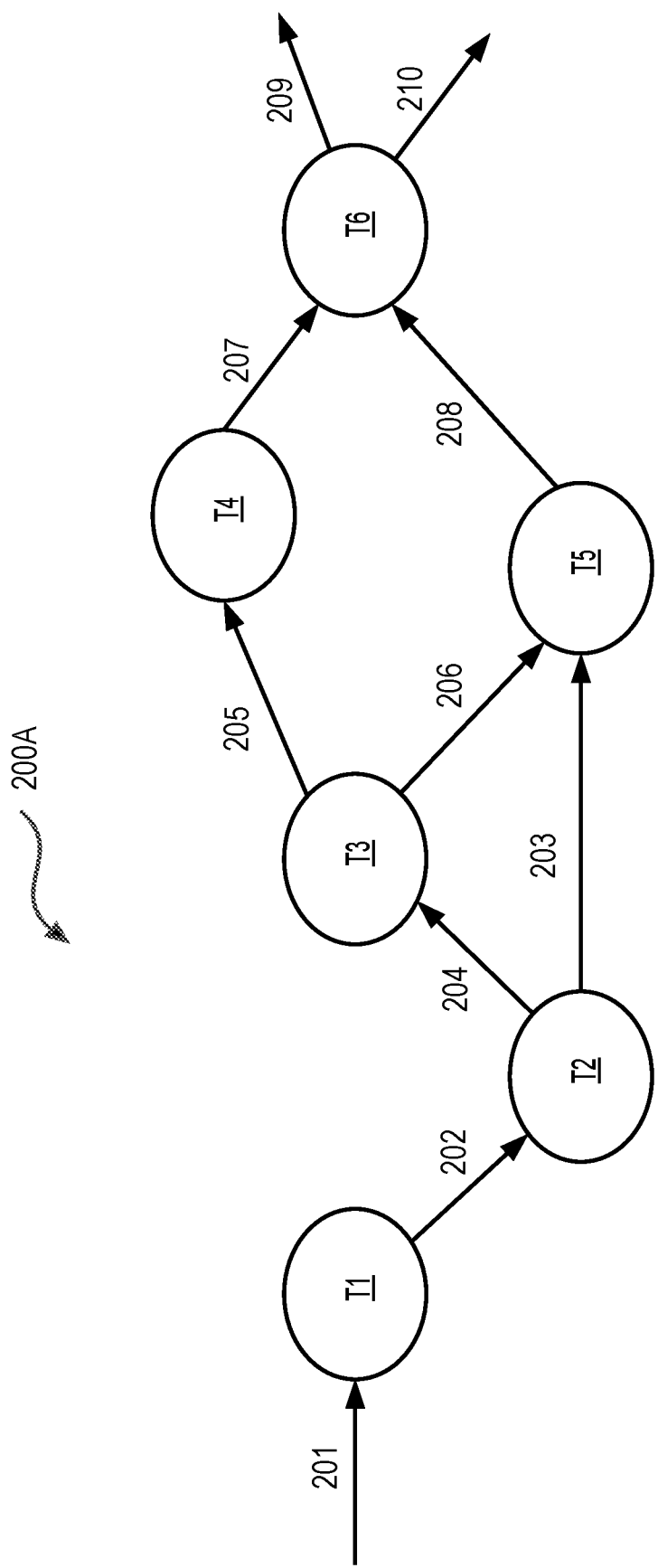
FIGS. 2A-2C show examples of workflows according to embodiments of the disclosure.

The workflow manager (103) can generate a workflow, for example, as represented by a graph (e.g., a DAG) from the WDD. FIG. 2A shows an example of a graph (e.g., a DAG) (200A) according to an embodiment of the disclosure. The DAG (200A) can include a plurality of nodes (T1)-(T6) and a plurality of links (or connections) (202)-(208). In an example, the DAG (200A) represents the workflow (200A).

Each node of the DAG (200A) can represent a media processing task in the workflow (200A). Various types of processing tasks, which are not limited to media processing, can be implemented in other embodiments. A link (e.g., the link (202)) connecting a first node (e.g., the node (T1)) to a second node (e.g., the node (T2)) in the DAG (200A) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s) can be connected to the media source (111), other workflow(s), and/or the like, and the workflow output(s) can be connected to the media sink (115), other workflow(s), and/or the like. The workflow (200A) has an input (201) and outputs (209) and (210). The workflow (200A) can have one or more outputs from intermediate nodes in some embodiments.

Figure 4A:
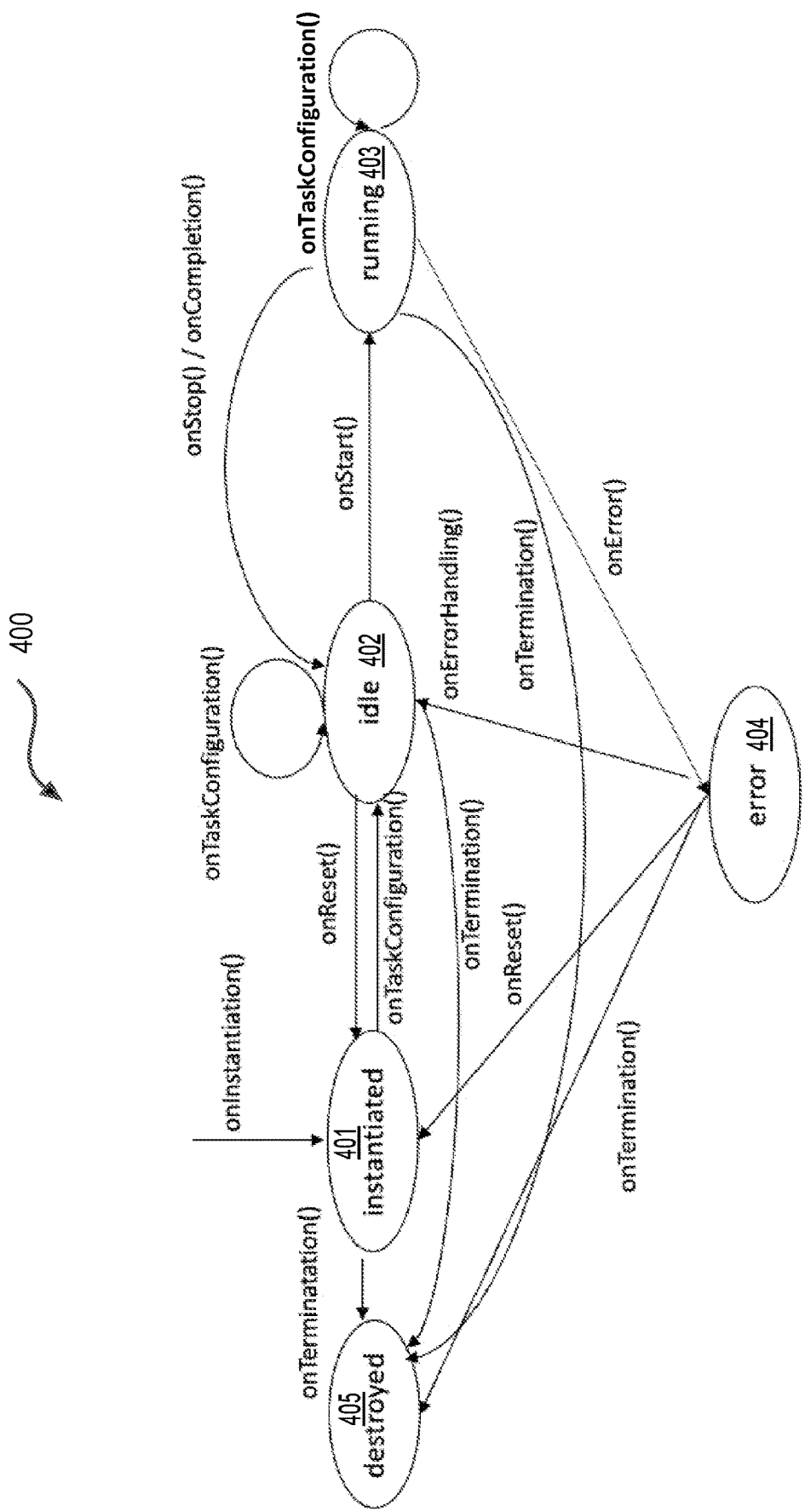
FIG. 4A shows an exemplary task lifecycle of a processing task according to an embodiment of the disclosure.

FIG. 4A shows an exemplary task lifecycle (400) of a media processing task according to an embodiment of the disclosure. The task lifecycle (400) can apply to other types of processing tasks. The media processing task can transition through different states at different points of an execution of the media processing task. The different states in the task lifecycle (400) can include an instantiated state (401), an idle state (402), a running state (403), an error state (404), a destroyed state (405), and/or the like.

The instantiated state (401): the media processing task is in the instantiated state (401) when the media processing task is instantiated by the workflow manager (103), for example, through services of an infrastructure manager as represented using an onInstantiation transition. When the media processing task is configured (e.g., as represented using an onTaskConfiguration transition), the instantiated state (401) can be transitioned (or changed) to the idle state (402). Alternatively, if the media processing task is terminated (e.g., as represented using an onTermination transition), the media processing task can move to the destroyed state (405).

The idle state (402): when the media processing task is in the instantiated state (401) and the workflow manager (103) can perform a task configuration (e.g., as represented using the onTaskConfiguration transition), the media processing task can move to the idle state (402). In the idle state (402), the media processing task is configured with the suitable processing. When the media processing task is started (e.g., as represented using the onStart transition), the media processing task can move to the running state (403). Alternatively, in the idle state (402), the media processing task can be reconfigured and stay in the idle state (402). In the idle state (402), if the media processing task is terminated (e.g., as represented using the onTermination transition), the media processing task can move to the destroyed state (405). In the idle state (402), if the media processing task is reset (e.g., as represented using the onReset transition), the media processing task can move to the instantiated state (401).

The running state (403): while the media processing task is in the idle state (402), and the media processing task is started (e.g., using the onStart transition), the media processing task can move from the idle state (402) to the running state (403). In the running state (403), the media processing task assigned to the MPE (113) can process data (e.g., media data from the media source (111)) that the media processing task receives from either a previous media processing task in the workflow or the NBMP source (101). Alternatively, in the running state (403), if the workflow manager (103) can perform reconfiguration of the media processing task (e.g., as represented using the onTaskConfiguration transition), and if the reconfiguration results in processing reconfiguration with execution on current media/metadata streams to the media processing task, then the media processing task can stay in the running state (403). In the running state (403), if the media processing task is stopped (e.g., as represented using the onStop transition) or completed (e.g., as represented using the onCompletion transition), the media processing task can move to the idle state (402). In the running state (403), if the media processing task encounters an error (e.g., as represented using the onError transition), the media processing task can move to the error state (404). In the running state (403), if the media processing task is terminated (e.g., as represented using onTermination transition), the media processing task can move to the destroyed state (405).

The error state (404): the media processing task can be in the error state (404) when the media processing task encounters an error and cannot process the media data or metadata. Upon handling the error (e.g., as represented using the onErrorHandling transition), the media processing task can move back to the idle state (402). Alternatively, while in the error state (404), the media processing task can be reset (e.g., as represented using onReset transition) such that the media processing task can move to the instantiated state (401). In the error state (404), if the media processing task is terminated, the media processing task can move to the destroyed state (405).

The destroyed state (405): the media processing task can be in the destroyed state (405) when the media processing task is terminated by the workflow manager (103). The media processing task can be disposed of and cannot be reused.

A state of the media processing task can be reflected in a 'state' parameter of a general descriptor. In some examples, each of the above transitions except the onError transition can occur by a task operation initiated by the workflow manager (103). The OnError transition can occur due to an internal state change of the media processing task.

Figure 4B:
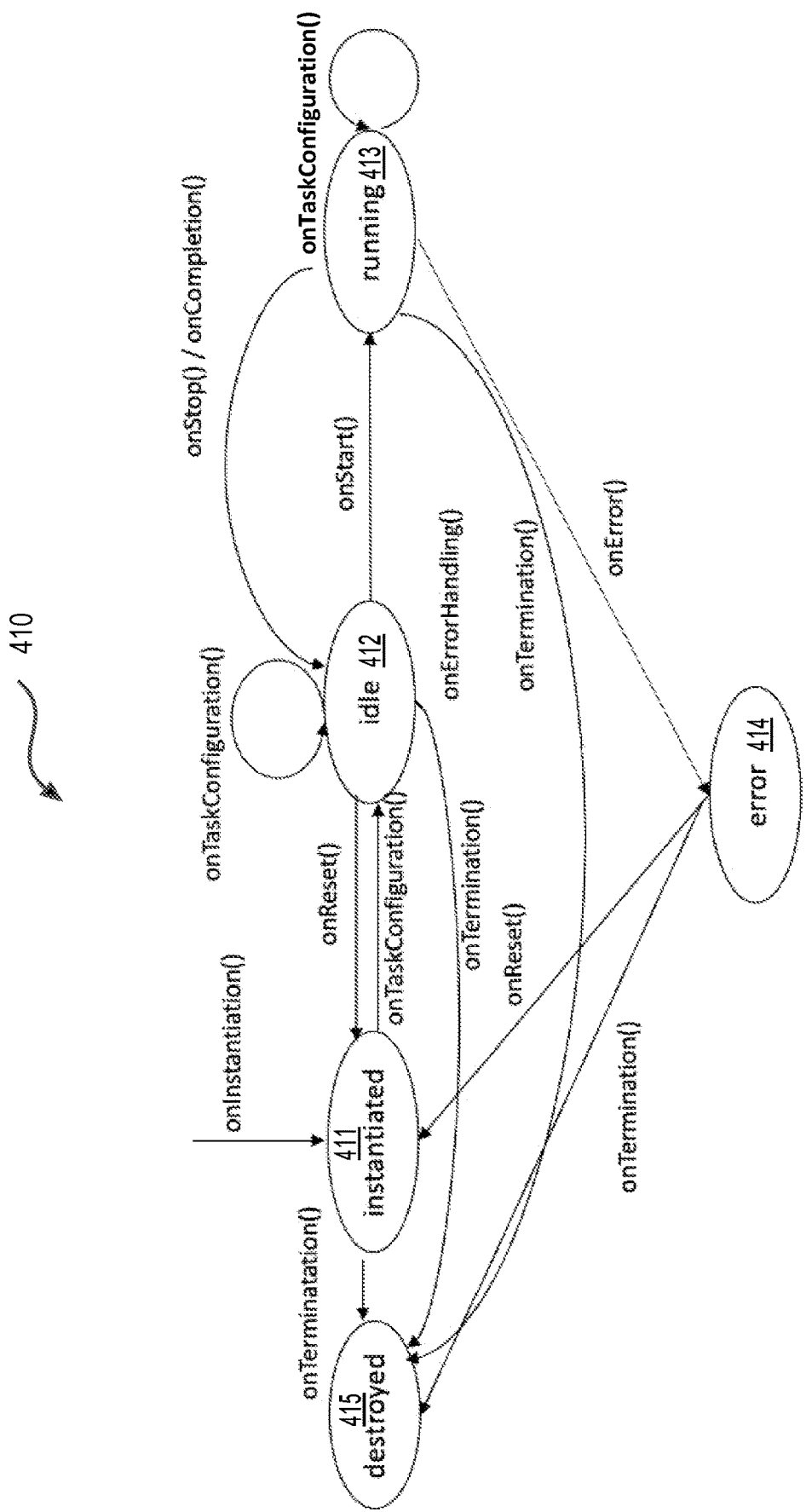
FIG. 4B shows an exemplary task lifecycle of a workflow according to an embodiment of the disclosure.

FIG. 4B shows an exemplary workflow lifecycle (410) of a workflow according to an embodiment of the disclosure.

The workflow can transition through different states at different points of an execution of the workflow. The different states in the workflow lifecycle (410) can include an instantiated state (411), an idle state (412), a running state (413), an error state (414), a destroyed state (415), and/or the like.

The instantiated state (411): the workflow can be put in the instantiated state (411) by the workflow manager (103), for example, through the services of infrastructure manager (e.g., as represented using onInstantiation transition). When the workflow is configured (e.g., as represented using onWorkflowConfig transition), the workflow can move to the idle state (412). Alternatively, if the workflow is terminated (e.g., as represented using onTermination transition) while in the instantiated state (411), the workflow can move to the destroyed state (415).

The idle state (412): when the workflow is in the instantiated state (412) and the workflow manager (103) performs workflow configuration (e.g., as represented using onWorkflowConfig transition), the workflow can move to the idle state (412). In the idle state (412), one or more MPEs are setup (e.g., via the infrastructure manager) and the tasks running in the MPEs are provisioned and configured. When the workflow is started (e.g., as represented using onStart transition), the workflow can move to the running state (413). Alternatively, in the idle state (412) the workflow can be reconfigured. The workflow can stay in the idle state (412) waiting for media data or metadata to arrive. In the idle state (412), if the workflow is terminated (e.g., as represented using onTermination transition), the workflow can move to the destroyed state (415). In the idle state (412), if the workflow is reset (e.g., as represented using onReset transition), the workflow can move to the instantiated state (411).

The running state (413): while the workflow is in the idle state (412), and the workflow is started (e.g., using onStart transition), the workflow can move from the idle state (412) to the running state (413). In the running state (413), the data from the NBMP Source (101) can be processed by the MPEs in the workflow. Alternatively, in the running state (413), if the workflow manager (103) performs reconfiguration of the workflow (e.g., as represented using onWorkflowConfig transition), and if the reconfiguration results in processing reconfiguration with execution on current media/metadata streams, then the workflow can stay in the running state (413). In the running state (413), if the workflow is stopped (e.g., as represented using onStop transition), or the processing is completed (e.g., as represented using onComplete transition), the workflow can move to the idle state (412). In the running state (413), if the workflow encounters an error (e.g., as represented using onError transition), the workflow can move to the error state (414). In the running state (413), if the workflow is terminated (e.g., as represented using onTermination transition), the workflow can move to the destroyed state (415).

The error state (414): the workflow is in the error state (414) when the workflow encounters an error and cannot continue with workflow processing. Upon handling the error (e.g., as represented using onErrorHandling transition), the workflow can move back to the idle state (412). Alternatively, while in the error state (414), the workflow can be reset (e.g., as represented using onReset transition) such that the workflow can move to the instantiated state (411). In the error state (414), if the workflow is terminated, the workflow can move to the destroyed state (415).

The destroyed state (415): the workflow is in the destroyed state (415) when the workflow is terminated by the workflow manager (103). The workflow can be instantiated for the workflow to be used again.

In some examples, each of the above transitions except the onError transition can occur by a workflow operation initiated by the NBMP source (101). The OnError transition can occur due to internal state changes of the workflow.

In an example, a concept of processing media on a cloud is developed by an NBMP project. However, a NBMP design does not provide a single method for monitoring, reporting, and notification. In some examples, the message format for reporting or notification is not defined.

In some examples, partial running of a NBMP workflow is not allowed, and thus all the tasks in the workflow are to be instantiated for the workflow to operate and all the tasks are to work simultaneously. Therefore, the underlying platform is to dedicate resources (e.g., computational resources, memory resources, bandwidths) to all the tasks in the workflow at a same time. The substantial allocation of resources may not be available or may be available but at a high cost.

To increase media processing efficiency, faster and lower cost deployment of media services, and the ability to provide large scale deployment by leveraging public, private or hybrid cloud services, aspects of the disclosure provide methods and apparatuses to allow a task in a workflow to be operated or run one step at a time and/or one group of steps at a time. The above functionality or the step-by-step mode is advantageous, for example, when there are not enough resources (e.g., memory resources, computational resources) for running the entire workflow at the same time. Methods and embodiments disclosed in the disclosure can be used in any suitable workflow implementation on cloud computing or on any suitable platform utilizing workflow(s).

According to aspects of the disclosure, a step mode function, such as a buffering function (e.g., a first-in-first-out function, variations of a first-in-first-out function as described below), can be added to a workflow. The step mode function can enable a step-based operation or a step-by-step operation for tasks in the workflow or workflows in a plurality of workflows. Accordingly, multiple steps are used to process data. Using the step mode, the workflow can run tasks separately, and thus a subset of tasks in the workflow can run at a same time while remaining task(s) are not running. In an example, the workflow includes six tasks. In an example, the subset of tasks includes one task, and thus the one task can process data in a running state while the other five tasks are not running. The other five tasks can be in non-running states (e.g., idle state(s) and/or destroyed state(s) as described below) and do not process data. In another example, the subset of tasks includes two tasks, and thus the two tasks can run at the same time while the other four tasks are not running.

In another example, the plurality of workflows includes a first workflow and a second workflow. When the first workflow is running to process data, the second workflow is in a non-running state (e.g., an idle state or a destroyed state as described below) and does not process data.

In an embodiment, media data to be processed by the tasks in the workflow can include a plurality of subsets of the media data. According to aspects of the disclosure, the media data can be processed in a unit of one or more of the plurality of subsets, and can be processed in the step mode (or step-by-step). The step size can be one or more of the plurality of subsets.

A largest step size can be the entire media data and the media data is processed in a single step. In an example, the media data includes 100 frames, and includes 10 subsets.

Each subset includes 10 frames. The media data can be processed in a single step having a step size of 100 frames. Alternatively, the media data can be processed in 10 steps having a step size of 10 frames. The step size need not be fixed in some embodiments. For example, a last step may have a smaller step size than other steps in a workflow.

Each task can run in one or more steps, and can process one of the plurality of subsets of the media data in one step. Certain task(s) may run multiple steps before other step(s) can process or start running.

In each step of a task execution, a portion (e.g., one of the plurality of subsets, such as 10 frames) of the media data (e.g., 100 frames) can be processed, and an output (also referred to as task output) of the task having a limited duration (or a limited length, a limited size) can be generated. Then the task can stop (e.g., the task is transitioned to a non-running state such as an idle state or a destroyed state as described below). According to aspects of the disclosure, the task is allowed to run in a stateless mode where state information (e.g., internal states and data) of the task that is the non-running state is not stored. For example, a task in the non-running state can be terminated or placed in an idle state). In an example, the non-running state is an idle state or a destroyed state.

In some examples, the resources allocated for the task can be freed. Then a next task can transition from a non-running state to a running state to process the data at an input of the next task and produce an output having a limited duration. Subsequently, the next task can transition to a non-running state, where no state information (e.g., internal states and data) of the next task is stored, and the process continues to another task.

The benefits of the step process (or step-based process) of a workflow can be described below. A workflow can be executed with limited resources or reduced resources because only one or a few tasks in the workflow operate (or run) at a same time and other tasks in the workflow are stopped. The cost of operation can be reduced by halting a workflow during high traffic time and/or expensive hours of day for using cloud services. For example, the workflow can be stopped at high traffic time, such as during heavy traffic on the internet. A workflow may be completely serialized, for example, executing an initial task to process the entire media data (e.g., a movie) while other tasks in the workflow are not running, and moving to a next task to process the entire media data while other tasks in the workflow are not running. For example, the size of a step (or an amount of data to process in one step) can be the entire media data. Accordingly, the initial task (T1) can run or process the entire movie in one step. Tasks with various computational complexities can be executed on the same hardware. A step of a simpler task can be executed faster, while execution of a step of more complex tasks can take more time. Use of the stateless mode can be advantageous in certain computing platforms, such as cloud platforms, where tasks can be put in non-running states with no need to store state information (e.g., internal states) of the tasks.

Aspects of the disclosure provide a segment processing mode for functions and running tasks based on the step model described above. Functions or corresponding tasks can be designed to support the segment processing mode, for example, to process a certain amount of data.

Aspects of the disclosure describe a buffering function (e.g., an indexed first-in-first-out (FIFO) (iFIFO) function). A buffer can be configured for the buffering function, for example, an iFIFO buffer is configured for the iFIFO function. In an embodiment, the buffering function (e.g., the iFIFO function) can operate on segments (also referred to as buffer segments), and thus enable the segment processing mode. According to the disclosure, the iFIFO function can store indexed buffer segments (also referred to as entries) of data, such as a bitstream. The iFIFO function can have the following properties: (i) a FIFO buffer where a first entry that is stored in the FIFO buffer is a first entry that is read out of the FIFO buffer and (ii) a unit of operation in the FIFO is an entry. Each entry has the following attributes: a start time $s_i$ (e.g., in milliseconds (ms)), a duration $d_i$ (e.g., in ms), and a length $l_i$ (e.g., in bytes) where an integer i indicates a position of the entry in the iFIFO buffer. In an example, each entry (or each buffer segment) is indexed with the corresponding start time $s_i$, the duration $d_i$, and the length $l_i$ as ($s_i$, $d_i$, $l_i$). Configuration parameters of the iFIFO task can include a total size of the FIFO buffer (e.g., in a number of entries) and a maximum size of each entry (e.g., in bytes). In an example, a maximum amount of data that can be stored in the iFIFO is equal to the total size of the FIFO buffer multiplied by the maximum size of each entry, and can be referred to as a buffer size.

In an example, the iFIFO function or the iFIFO task is configured to generate an event (e.g., a full event, a partially full event) indicating that an amount of data stored in the iFIFO task is equal to a threshold. The iFIFO function or the iFIFO task is configured to generate another event (e.g., an empty event) indicating that the amount of data stored in the iFIFO task is empty or is provided to a processing task.

An indexed input or an indexed output of the iFIFO buffer can provide a start time, a duration, and a length of a next buffer segment at the input or the output of the iFIFO buffer, and thus each buffer segment is indexed.

According to the disclosure, the buffering function can be a multi-index FIFO function (MiFIFO), for example, for processing multiple bitstreams. The MiFIFO function can include multiple FIFO buffers. Each of the multiple FIFO buffers can be identical or similar to the iFIFO buffer described above. Corresponding buffer segments across the multiple FIFO buffers can be aligned in the time domain. In an example, the MiFIFO includes a first iFIFO and a second iFIFO. The first iFIFO includes first buffer segments 0-4 having respective first starting times and first durations. The second iFIFO includes second buffer segments 0-4 having respective second starting times and second durations. In an example, the first starting times of the first buffer segments 0-4 are identical to the second starting times of the second buffer segments 0-4, respectively, and the first durations of the first buffer segments 0-4 are identical to the second durations of the second buffer segments 0-4, respectively. A MiFIFO function can be used when a task has multiple inputs or multiple outputs.

In an example, the MiFIFO function or the MiFIFO task is configured to generate an event (e.g., a full event, a partially full event) indicating that an amount of data stored in the MiFIFO task is equal to a threshold. The MiFIFO function or the MiFIFO task is configured to generate another event (e.g., an empty event) indicating that the amount of data stored in the MiFIFO task is empty or is provided to a processing task.

The buffering function (e.g., an iFIFO function, a MiFIFO function) can support events, such as an empty event and a full event as described below. The empty event can be generated when the buffer (e.g., an iFIFO buffer) is empty or the multiple buffers (e.g., iFIFO buffers in the MiFIFO function) are empty (e.g., data stored in the buffer is read by or is provided to a corresponding task). The full event can be generated when the buffer (e.g., an iFIFO buffer) is full or each of the multiple buffers (e.g., iFIFO buffers in the MiFIFO function) is full. In some examples, the buffering function can support an X % (or % X) event. X can be a configuration parameter, such as a value that is larger than 0 and smaller than or equal to 100. In an example, X is smaller than 100, and the X % event can be referred to as a partial full event. The X % event can be generated when each iFIFO buffer is X percent full. When the iFIFO buffer is X % full, an event (or the X % event) can be generated. One or multiple values for X can be set as configuration parameters. A buffering task (e.g., an iFIFO task, a MiFIFO task) can be instantiated to implement the buffering function (e.g., an iFIFO function, a MiFIFO function).

The benefits of the buffering function can be described below. The buffering function is a simple function that can be implemented in any suitable platform, providing a buffer and including cache memory, random access memory, long term storage such as solid state and hard disks. Events (e.g., the empty event, the full event) can be generated based on emptiness and fullness of the buffer(s). Therefore the buffering task can inform the workflow manager (103) of a status of the buffering task efficiently.

According to aspects of the disclosure, a workflow can be converted to a step-enabled workflow (or a step-based workflow, a step-by-step workflow, a step-able workflow) by adding one or more buffering tasks (e.g., iFIFO tasks, MiFIFO tasks) in the workflow. The step-enabled workflow can operate in the step mode operation. A buffering task can be provided between two tasks. The two tasks can include a task A and a task B where an output of the task A is provided to an input of the task B.

Figure 2B:
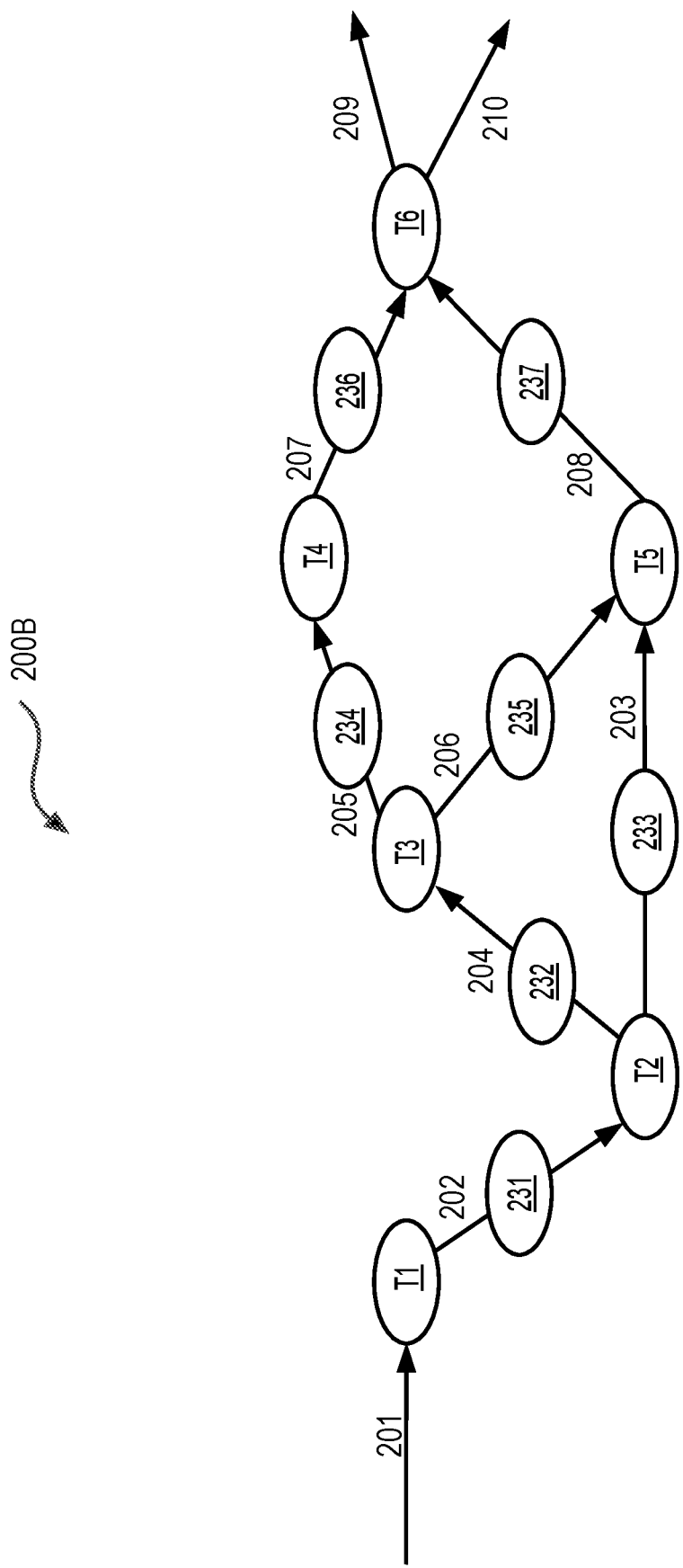

Referring to FIGS. 2A-2B, the workflow (200A) can be referred to as a regular workflow (200A). In an example, the regular workflow (200A) is not a step-based workflow. The regular workflow (200A) can be converted into a step-based workflow (e.g., a workflow (200B)) by inserting at least one buffering task into the regular workflow (200A). In general, a task in the step-based workflow can have a first number of input buffering tasks that provide data to be processed to the task and a second number of output buffering tasks that store data that is processed by the task. The first number can be any suitable non-negative integer, such as 0, 1, 2, or the like. The second number can be any suitable non-negative integer, such as 0, 1, 2, or the like. In some examples, such as shown in FIG. 2B, no buffering task is provided for each workflow input (e.g., (201)) to the step-based workflow. In some examples, at least one buffering task is provided for the workflow input(s) to the step-based workflow. In some examples, such as shown in FIG. 2B, no buffering task is provided for each workflow output (e.g., (209) or (210)) from the step-based workflow. In some examples, at least one buffering task is provided for the workflow output(s) from the step-based workflow.

In an example shown in FIG. 2B, buffering tasks (e.g., iFIFO tasks) (231)-(237) are provided for the respective links (202)-(208), respectively. For example, the task (T1) is connected to a workflow input and is connected to no input buffering tasks. The task (T1) is connected to one output buffering task (231). The task (T2) is connected to one input buffering task (231), and two output buffering tasks (232)-(233). The task (T5) is connected to two input buffering tasks (233) and (235) and is connected to one output buffering task (237).

Each link (e.g., the link (202)) is a connection between two tasks (e.g., the tasks (T1)-(T2)) of the workflow (200B). The link (e.g., (202)) can represent data transfer from one (e.g., (T1)) of the two tasks to another (e.g., (T2)) of the two tasks. The buffering tasks (231)-(237) can be instantiated from the buffering function described above. In an example, the buffering tasks (231)-(237) include iFIFO tasks that are instantiated from the iFIFO function.

In general, a task pair (or two tasks) connected to a buffering task can include a "connect from" task and a "connect to" task for the buffering task. Referring to the buffering task (231) and the task pair (T1)-(T2) connected by the buffering task (231), the task (T1) is referred to as a "connect from" task and the task (T2) is referred to as a "connect to" task for the buffering task (231). The workflow (200B) includes seven task pairs corresponding to the seven buffering tasks (231)-(237).

Adding a buffering task between a task pair (including a "connect from" task and a "connect to" task) can allow the "connect from" task to run, generate an output, and fill a buffer (or each buffer) configured for the buffering task while the "connect to" task is not running. The "connect from" task can run until the buffer (or each buffer) is full or partially full (e.g., X % full) and the "connect from" task can have enough data for processing from buffer(s) connected to input(s) of the "connect from" task.

An amount of time that a task (e.g., (T1)) can run independently from other tasks (e.g., (T2)-(T6)) in the workflow (200B) can be defined by buffering tasks connected to input(s) and output(s) of the task. The buffering task(s) connected to the task input(s) can be referred to as the input buffering tasks (or input buffers), and the buffering task(s) connected to the task output(s) can be referred to as the output buffering task(s) (or output buffer(s)). In general, sizes of the buffers and the level of fullness (such as described by X %) can define a maximum size (or length) of a step (or a maximum step size) that the task can run.

In an example, for a task (e.g., (T2)) in the workflow (200B), when none of the input buffer(s) (e.g., (231)) of the task is empty and none of the output buffer(s) (e.g., (232)-(233)) of the task are full, the task (e.g., (T2)) can run independently from other tasks (e.g., (T1) and (T3)-(T6)) in the workflow (200B). In an example, when none of the input buffer(s) of the task is empty and none of the output buffer(s) of the task are X % full where X is a pre-configured value less than 100, the task (e.g., (T2)) can run independently from other tasks (e.g., (T1) and (T3)-(T6)) in the workflow (200B).

In an example, one or more tasks in a step-enabled workflow can run to process data while remaining tasks in the step-enabled workflow are not running. Referring to FIG. 2B, if the buffering task (231) is omitted, the tasks (T1)-(T2) can run to process data simultaneously while the tasks (T3)-(T6) are not running and are in non-running states (e.g., idle states and/or destroyed states). For example, the task (T1) runs to process next data and the task (T2) runs to further process data processed by the task (T1). In some examples, when the buffering task (231) is omitted, the tasks (T1) and (T2) do not run simultaneously, for example, when the task (T2) has no input data or when the task (T2) is not in the running state.

Advantages of converting a regular (non-step-based) workflow to a step-based workflow are described as below. The conversion is relatively simple and does not depend on the topology or complexity of the workflow, and thus can be performed in an unsupervised manner.

A processing task can be configured with a parameter task segment duration (TSD) (also referred to as task processing segment duration). The TSD for the processing task can refer to a duration in the time domain or a length of data such that output data at output(s) of the processing task can be independent from data outside of the duration or the length of data in any of input(s) of the processing task. For example, input data to the processing task has a first subset, a second subset, and a third subset each of which has a duration of the TSD. The processing task can process the first subset, the second subset, and the third subset independently from each other. When the processing task processes the second subset, a corresponding output data is only dependent on the second subset of data and is independent from the first set and the third set. Any suitable unit can be used for the TSD, such as time (e.g., ms), bytes, bits, or the like. The output data generated at the output(s) of the processing task are within the duration in the time domain or the length of data.

Figure 3:
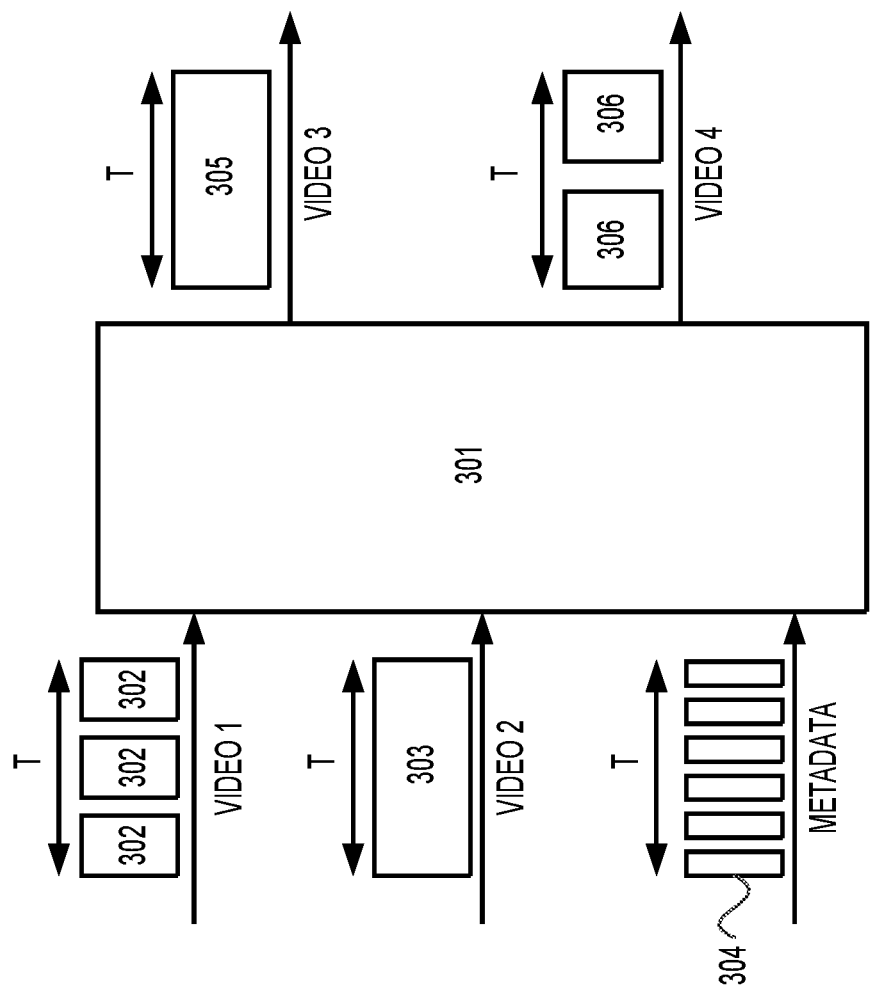
FIG. 3 shows an example of a task segment duration (TSD) for a task according to an embodiment of the disclosure.

FIG. 3 shows an example of a TSD configured for a task (301) according to an embodiment of the disclosure. The task (301) can be instantiated from a corresponding function, for example, in the function repository (105). The task (301) can implement any processing method, such as video stitching or other media processing method. For example, a video 1 from a first camera and a video 2 from a second camera is stitched by the task (301) based on metadata. The task (301) can output a video 3 that is a stitched video and a video 4. The video 4 can correspond to a different operation such as indexing. In some examples, the video 4 is identical to the video 3.

According to the disclosure, the task (301) can run and process, within a time window set by the TSD (e.g., a duration T in FIG. 3), input data from input(s) to generate output data at output(s) where the output(s) having a duration set to the TSD can be dependent only on the input data within the TSD. The output(s) can be independent from input data that are outside the time window. Subsequently, the task (301) can be stopped or destroyed at an end of each TSD and can be instantiated or started at a beginning of a next TSD.

In an example shown in FIG. 3, the TSD for the task (301) is T. The video 1 includes a plurality of subsets (302) of first media data. Each subset of first media data can have a first size where three subsets (302) of first media data are within the TSD T. The video 2 includes a plurality of subsets (303) of second media data. Each subset (303) of second media data can have a second size that is the TSD T. The metadata can include a plurality of subsets (304) of metadata. Each subset (304) of metadata can have a metadata size where six subsets (304) of metadata are within the TSD T.

For example, the input data including the three subsets (302) of first media data and the subset (303) of second media data are processed by the task (301), for example, based on the six subsets (304) of metadata to generate the outputs. The outputs includes a subset (305) of third media data for the video 3 and two subsets (306) of fourth media data for the video 4. The outputs (e.g., the video 3 and the video 4) of the task (301) can be independently generated within the time window having a duration (e.g., T) equal to the TSD. Subsequently, the task (301) can be stopped or destroyed at an end of the time window to transition to a non-running state. The non-running state can be idle state (402) or the destroyed state (405). According to the disclosure, when the task (301) is in the non-running state, no state information for the task needs to be stored since the task (301) can process input data without using prior data when the input data are processed within the time window having the duration TSD. Thus, no memory is required for previous processing and no previous state information is needed. The task (301) can be instantiated or started at a beginning of a next time window having a duration equal to the TSD. In an example shown in FIG. 3, the video 4 output can operate in independent segments (also referred to as task segments) with a duration of T/2.

Figure 5:
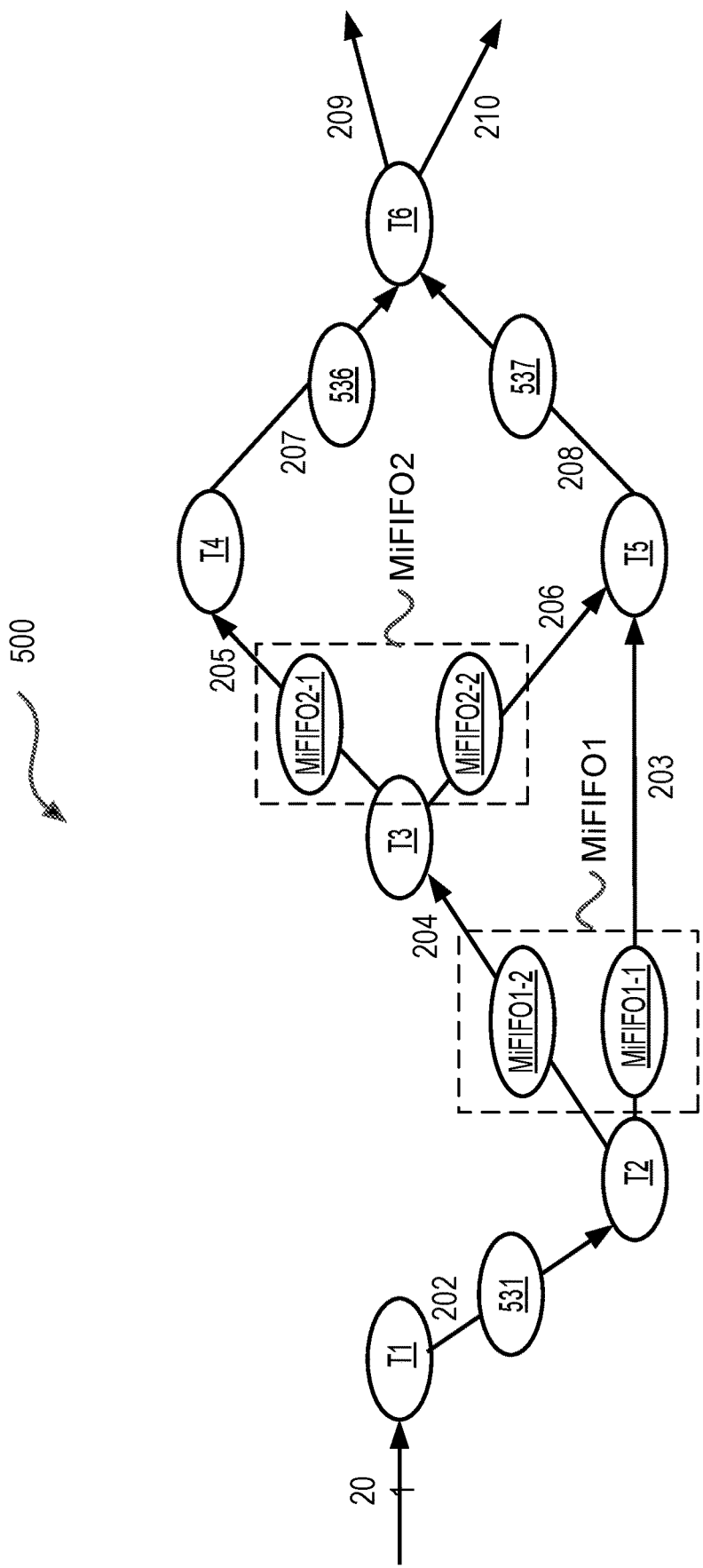
FIG. 5 shows an example of a workflow according to an embodiment of the disclosure.

The above description with reference to FIG. 2B can be suitably adapted to provide one or more MiFIFO tasks in a non-step based workflow to convert the non-step based workflow to a step-based workflow. Referring to FIGS. 2A and 5, the workflow (200A) can be converted into a step-based workflow (e.g., a workflow) (500) by inserting one or more MiFIFO tasks into the workflow (200A). In an example, when a task includes multiple outputs, a MiFIFO task is used.

Referring to FIG. 5, buffering tasks can include iFIFO tasks (531), (536), and (537), and two MiFIFO tasks (e.g., (MiFIFO1) and (MiFIFO2)). For example, the iFIFO task (531) is provided between the tasks (T1) and (T2). The task (T4) is connected to the iFIFO task (536). The task (T5) is connected to the iFIFO task (537). The iFIFO tasks (531), (536), and (537) can be instantiated from the iFIFO buffering function described above.

The task (T2) has two outputs, and thus can be connected to the MiFIFO task (MiFIFO1). The (MiFIFO1) task can be configured with two iFIFO buffers (MiFIFO1-1) and (MiFIFO1-2) corresponding to the links (203)-(204), respectively. The task (T3) has two outputs, and thus can be connected to the MiFIFO task (MiFIFO2). The (MiFIFO2) task can be configured with two iFIFO buffers (MiFIFO2-1) and (MiFIFO2-2) corresponding to the links (205)-(206), respectively. The MiFIFO tasks (MiFIFO1) and (MiFIFO2) can be instantiated from the MiFIFO buffering function described above.

Adding a MiFIFO task (e.g., (MiFIFO1)) can allow the "connect from" task (e.g., (T2)) to run, generate an output, and fill iFIFO buffers (e.g., (MiFIFO1-1) and (MiFIFO1-2)) configured for the MiFIFO task (e.g., (MiFIFO1)) while the "connect to" task(s) (e.g., (T3) and (T5)) are not running. The "connect from" task can run until the iFIFO buffers are full and the "connect from" task can have enough data for processing from buffer(s) connected to input(s) of the "connect from" task.

In some examples, the iFIFO tasks (531), (536), and (537) are replaced by MiFIFO tasks, and thus the workflow (500) is configured with MiFIFO tasks.

In an example, when a task includes multiple inputs, a MiFIFO task is provided at the inputs and the above description can be suitably adapted.

The workflows (200B) and (500) can be configured to operate in the stateless mode by using processing tasks configured with TSDs. Referring to FIG. 2B, when an iFIFO task duration (or a maximum amount of data that can be stored in the iFIFO task) of each iFIFO task is set to be at least the TSD size of the processing task (or the "connected to" task) that the iFIFO task is connected to, the "connected to" task can operate and generate output(s) for one TSD. As described above, the "connected to" task does not need to carry or store state information for generating a next task segment at the outputs, and thus no state information is stored. The processing task (e.g., the "connected to" task) can be referred to as a stateless step-enabled processing task. The workflow (200B) including stateless step-enabled processing tasks can be configured to operate in the stateless mode and can be referred to as a stateless step-enabled workflow. The above description can be suitably adapted to MiFIFO tasks and a workflow (e.g., the workflow (500)) that includes MiFIFO task(s).

While the data (e.g., a task segment) generated in one TSD is independent from data (e.g., other task segments)

outside the TSD, a beginning and an end of the data can be important. For example, if an encoder starts encoding, the beginning of a bitstream that the encoder generates (e.g., due to headers) is different from other segments generated afterward. Therefore, an iFIFO buffer can be configured to store additional information, such as a start time, a duration and a length, as described above.

Figure 6:
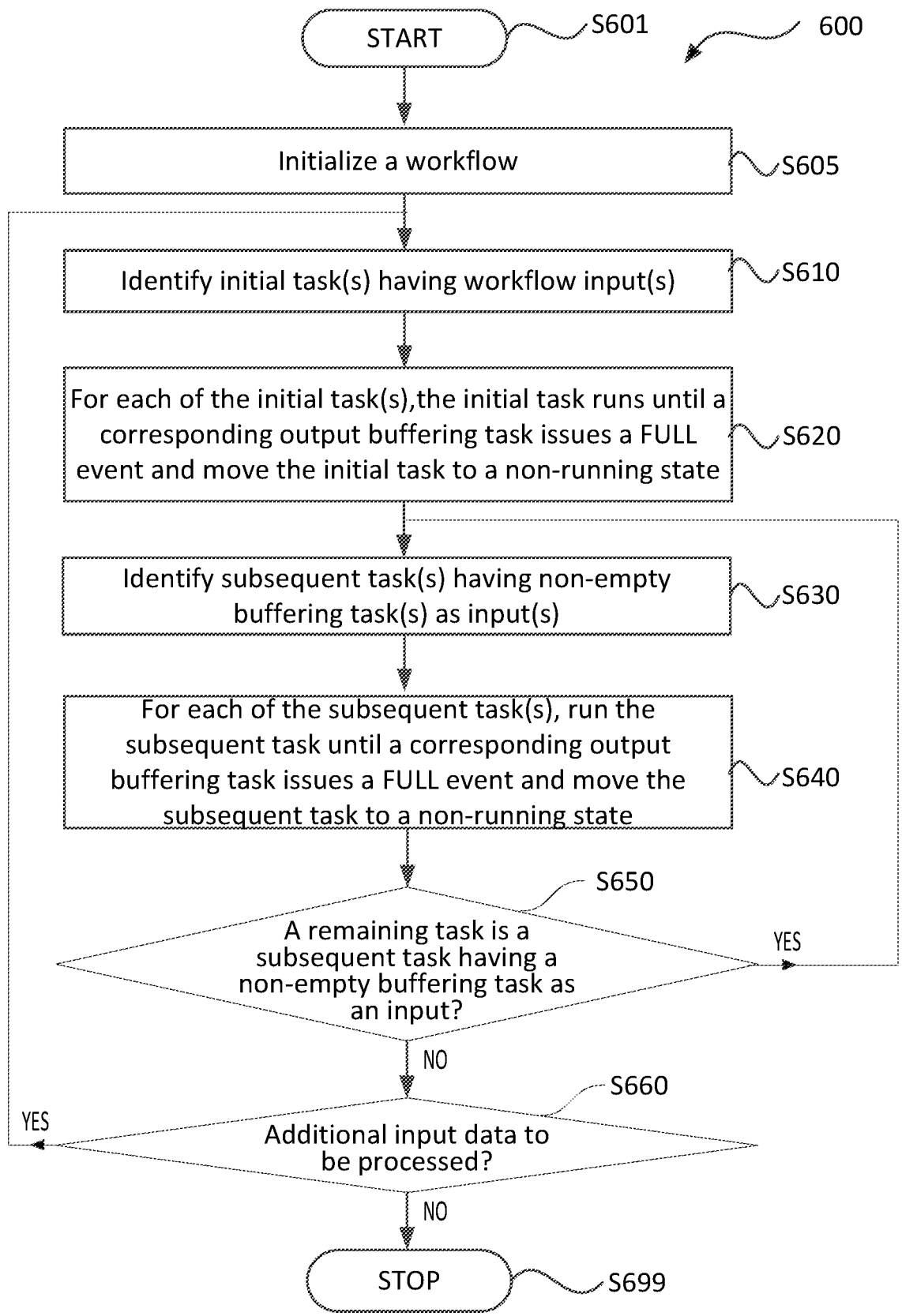
FIG. 6 shows a flow chart outlining a process according to an embodiment of the disclosure.

FIG. 6 shows a flow chart outlining a process (600) according to an embodiment of the disclosure. The process (600) can be applied to operations of any suitable step-enabled workflow having any suitable number of workflow input(s) and any suitable number of workflow output(s). The step-enabled workflow can include any suitable number of processing tasks and any suitable links (or connections) connecting two of the tasks. The step-enabled workflow can include buffering task(s) (e.g., iFIFO task(s), MiFIFO task(s), or a combination of iFIFO task(s) and MiFIFO task(s)) and the buffering task(s) can be provided at the respective links. The step-enabled workflow can be the workflow (200B) or (500).

In an example, the step-enabled workflow is the workflow (500) in FIG. 5. The workflow (500) can include MiFIFO tasks where the buffering tasks (531), (536), and (537) are MiFIFO tasks. Each of the tasks (T1)-(T6) can have the task lifecycle (400), the different states (401)-(405), and the corresponding transitions described with reference to FIG. 4A. The step by step (or step based, step-enabled) operation of the workflow can be implemented as described below. Any suitable data processing system (e.g., an NBMP system) can implement the step by step operation of the workflow. The description below is given for the data processing system (100) and can be suitably adapted to any suitable data processing system (e.g., an NBMP system).

At (S605), the workflow can be initialized as described below. Let TSD(k) represent TSDs of processing tasks T(k) of an initial workflow where k is a non-negative integer from 0 to L−1, and L is a number of the processing tasks in the initial workflow. The initial workflow can be a non-step-enabled workflow.

A workflow segment duration (WSD) can be determined based on the TSDs. For example, the WSD is calculated based on the least common multiple (LCM) of the TSDs. In an example, the WSD is calculated using Eq. (1) as below:

$$WSD=LCM(TSD(0), \ldots ,TSD(L-1)) \qquad Eq(1)$$

The workflow (or the step-enabled workflow) can be generated by providing a MiFIFO task at output(s) of each processing task where data from the output(s) are input(s) to other task(s) in the workflow. For example, referring to FIG. 5, the MiFIFO task (MiFIFO1) is provided for the two outputs of the task (T2). The MiFIFO tasks can have a length (or size) based on a parameter S and the WSD where the parameter S is an integer (e.g., 1, 2, or the like) indicating a step size of the step-enabled workflow. In an example, the step size can be S multiplied with the WSD. In an example, the parameter S indicates a number of steps that a processing task (e.g., (T2)) is configured to run consecutively.

Each MiFIFO task can be reset to be empty with a corresponding sequence number being 0.

At (S610), initial task(s) among the processing tasks in the workflow can be identified, for example, by the workflow manager (103). Input(s) of each of the initial task(s) can be workflow input(s). For example, all the input(s) of the initial task(s) are connected to the data source (e.g., the media source) (111). The initial task(s) can be labeled as Ti0, Ti1, . . . , TiN where N is a non-negative integer. Referring to FIG. 5, the initial task(s) identified in the workflow (500) include the task (T1) where Ti0 is (T1) and N is 0.

At (S620), the identified initial task(s) Ti0, Ti1, . . . , and TiN can run sequentially. Referring to the example shown in FIG. 5, the initial task includes (T1). The following description can be applied for each identified initial task.

The workflow manager (103) can send a request to the initial task (T1) and move the task (T1) to the running state (403).

The initial task (T1) can run for S (e.g., 1, 2, or the like) steps and process a portion of input data in each step. For example, the portion of the input data has a duration or length determined based on the WSD. In an example, the duration (or length) is equal to the WSD in each step.

When an amount of data output by the initial task (T1) to the MiFIFO task reaches or approaches a first threshold, such as a total duration (or a total size) of S×WSD, the MiFIFO task (e.g., the MiFIFO task (531)) is filled (or partially filled to X % full where X is less than 100). The first threshold can be any suitable duration or size and can be represented using any suitable unit. The first threshold can be based on the TSDs, the WSD, and/or the parameter S.

Accordingly, the MiFIFO task can send a full event (or a partially full event if, for example, the total duration of S×WSD is X % full) to the workflow manager (103). For example, S is 2, when the amount of data output by the task (T1) reaches 2WSD, the MiFIFO task (531) can generate the full event (or the partially full event) and send a notification to the workflow manager (103).

The workflow manager (103) can send a request to the task (T1), moving the task (T1) from the running state (403) to a non-running state, such as the idle state (402) or the destroyed state (405). In the non-running state (e.g., the idle state (402) or the destroyed state (405)), the state information (e.g., the status and values of the internal functions) of the task (T1) does not need to be maintained or stored, and thus in some examples, the state information is not stored in the non-running state and the task (T1) can run in the stateless mode.

(S620) can be repeated for each of the initial task(s). The above description for (T1) can be suitably adapted for other initial task(s). In an example, the initial task(s) have different thresholds including the first threshold. Alternatively, the initial task(s) have the identical first threshold.

At (S630), the workflow manager (103) can identify subsequent task(s) where all inputs of the subsequent task(s) are connected to non-empty buffering task(s) (e.g., iFIFO task(s), MiFIFO task(s)). The subsequent task(s) can be labeled as Tj0, Tj1, . . . , TjM where M is a non-negative number. Referring to FIG. 5, the non-empty buffering task(s) includes the buffering task (531) that stores the amount data that is processed by the task (T1). The subsequent task(s) identified at (S630) includes (T2), and thus Tj0=(T2) and M is 0.

At (S640), the identified subsequent task(s) Tj0, Tj1, . . . , TjM can run sequentially. Referring to the example shown in FIG. 5, the subsequent task includes (T2). The following description can be applied for each identified subsequent task.

The workflow manager (103) can send a request to the subsequent task (T2) and move the task (T2) to the running state (403).

The subsequent task (T2) can run for S (e.g., 1, 2, or the like) steps and process data stored in the buffering task (531), for example, having the duration or length determined based on the WSD in each step. In an example, the duration (or length) is equal to the WSD in each step.

When an amount of data output by the subsequent task (T2) reaches or approaches a second threshold, such as the total duration (or the total size) of S×WSD, the MiFIFO task can be filled (or partially filled to X % full where X is less than 100). Accordingly, the MiFIFO task (e.g., the MiFIFO task (MiFIFO-1)) can send a full event (or a partially full event) to the workflow manager (103). For example, S is 2, when the amount of data output by the task (T2) reaches 2WSD, the MiFIFO task (MiFIFO-1) can generate the full event (or a partially full event if, for example, the total duration of S×WSD is X % full) and send a notification to the workflow manager (103). The second threshold can be any suitable duration or size and can be represented using any suitable unit. The second threshold can be based on the TSDs, the WSD, and/or the parameter S.

The workflow manager (103) can send a request to the task (T2), moving the task (T2) from the running state (403) to a non-running state, such as the idle state (402) or the destroyed state (405). In the non-running state (e.g., the idle state (402) or the destroyed state (405)), the state information (e.g., the status and values of the internal functions) of the task (T2) do not need to be maintained or stored, and thus in some examples, the state information is not stored in the non-running state and the task (T2) can run in the stateless mode.

(S640) can be repeated for each of the subsequent task(s). The above description for (T2) can be suitably adapted for other subsequent task(s). In an example, the subsequent task(s) have different thresholds including the second threshold. Alternatively, the subsequent task(s) have the identical second threshold. In an example, the plurality of processing tasks in the workflow has the identical threshold, such as S×WSD.

At (S650), whether a remaining task to be processed is a subsequent task can be determined. As described above, all input(s) of the subsequent task are non-empty buffering tasks (e.g., MiFIFO tasks). When the remaining task is determined to be the subsequent task, the process (600) returns to (S630), and thus (S630) and (S640) are repeated for the newly identified subsequent task(s). When no remaining task is determined to be the subsequent task, the process (600) proceeds to (S660).

For example, the task (T3) is the newly identified subsequent task, and (S640) is repeated for the task (T3). Subsequently, (S650) and (S630) are repeated, and thus the tasks (T4)-(T5) are identified as the new subsequent tasks, and (S640) is repeated for (T4)-(T5). Finally, (T6) is identified, and (S640) is repeated for (T6).

In general, (S630) and (S640) can be repeated for remaining subsequent task(s) having input(s) connected to non-empty buffering task(s) until all tasks in the workflow (500) have been run to process data. Thus, when no remaining task is determined to be the subsequent task, the process (600) proceeds to (S660).

At (S660), whether additional input data remain to be processed is determined. When no additional input data are determined to be processed, the process (600) proceeds to (S699) and terminates. When the additional input data are determined to be processed, the process (600) returns to (S610) and repeat (S610), (S620), (S630), (S640), and (S650) for another subset (e.g., having the duration of S×WSD) of the input data.

In an example, the processing tasks in the workflow run in the stateless mode, and thus the workflow can run in the stateless mode where no state information for processing task(s) in the non-running states is saved when the processing task(s) are in the non-running states.

The process (600) can be suitably adapted. Step(s) in the process (600) can be modified and/or omitted. Additional step(s) can be added. Any suitable order of implementation can be used. In an example described above, in one step, when one task runs, other tasks in the workflow (500) are not running. In another example, one or more tasks can run simultaneously in a step while other tasks in the workflow are not running.

In an example, input data to be processed by a step-enabled workflow is divided into a plurality of buffer segments where each buffer segment is indexed. Thus, the input data can include a plurality of subsets of the input data where each subset includes multiple indexed buffer segments. A size or length of each subset can be determined based on the TSDs of the processing tasks and/or the parameter S. In an example, the length of each subset is S×WSD (e.g., WSD, 2WSD, 3WSD), and each processing task can process the subset of the input data having the length of S×WSD before transitioning to a non-running state. In an example, the TSDs are identical, and thus WSD is equal to TSD of each processing task, and thus the length of each subset is SxTSD, such as TSD, 2TSD, 3TSD, or the like.

The process (600) is described using the workflow (500) having MiFIFO tasks. The process (600) can be suitably adapted to a step-enabled workflow having iFIFO tasks, such as the workflow (200B). The process can be suitably adapted to step-enabled workflow having iFIFO task(s) and MiFIFO task(s).

The benefits of the process (600) and/or the step-by-step workflow (500) can be described as below. The logic is simple for the data processing system (e.g., the NBMP system) (100) (e.g., the workflow manager (103)) to execute the process (600). A propagation model can start from the workflow input(s) and execute one step of each task, followed by task(s) connected to output(s) of the task. The process (600) and/or the workflow (500) can generate the output(s) of workflow in a plurality of steps. The steps can be triggered by events and therefore the workflow management can be very efficient. The step size S can be selected to be any suitable number.

According to the disclosure, to implement a stateless step-enabled processing task, a corresponding function that can be instantiated to generate the processing task can be configured with configuration parameter(s) and input parameter(s). The configuration parameters can include the TSD parameter as described above. The TSD can determine a duration of a task segment that the processing task can process independently from other task segments in data to be processed. In some examples, the TSD parameter is dependent on other configuration parameters for the processing task. The configuration parameters can include operating-samples that refer to a number of TSD(s) the processing task can operate in the stateless mode. For example, output(s) are generated based on processing N1 input samples, where N1 can be an integer that is associated with the TSD. The input parameter can include additional inputs, such as metadata. The additional input(s) can indicate a start time, a duration, and/or the like of an input task segment in input data. The duration of the input task segment can be a TSD.

In an example, input data to be processed is divided into a plurality of buffer segments and each buffer segment can be indexed to provide the start time, the duration, and the length for the buffer segment.

The above design of a step-based workflow can be applied to an entire workflow, e.g., the workflow can be executed step-by-step by implementing buffering tasks (e.g., iFIFO task, a MiFIFO task) at workflow input(s) and/or workflow output(s). The benefit of the above approach is that while individual tasks of the workflow may not be step-enabled, the workflows can be processed in steps. Therefore, the workflow can be executed step-by-step. Thus, when the platform resources are not available continuously to execute the entire session in one step, one or more workflows can run while remaining workflows are not running (e.g., in an idle state or a destroyed state). When the workflow is a part of multi-workflow setup and each workflow can be executed step-by-step, not all workflows are running at the same time.

Figure 2C:
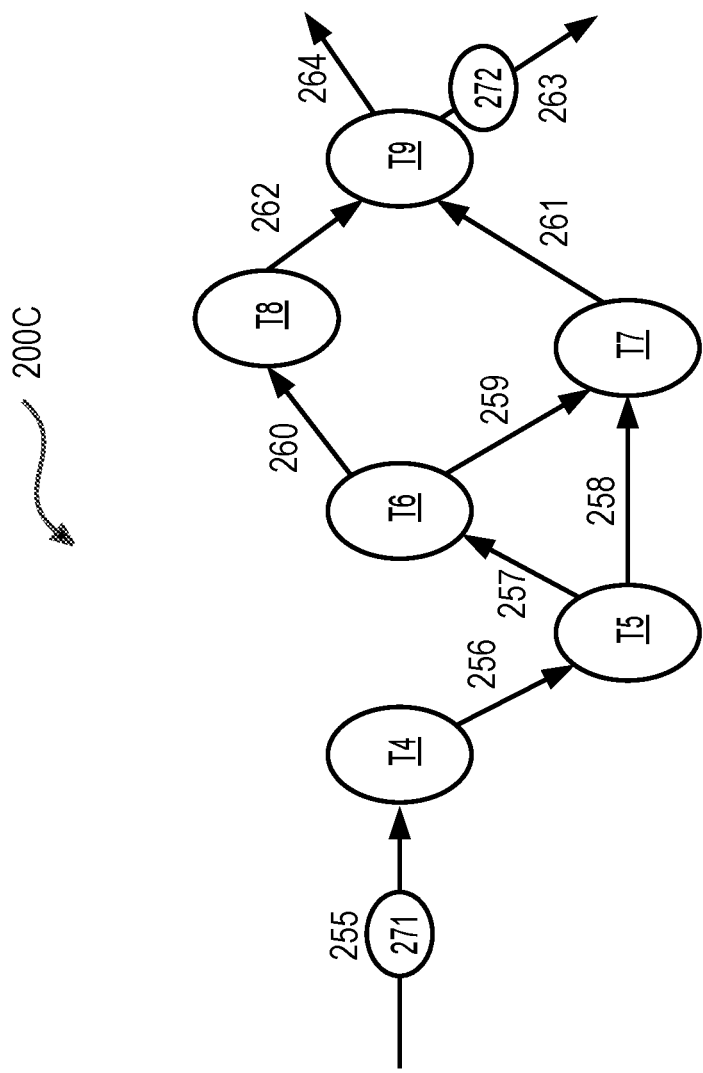

FIG. 2C shows an example of a workflow (200C) according to an embodiment of the disclosure. The workflow (200C) includes processing tasks (or tasks) (T4)-(T9). In an example, no buffering tasks are inserted between two of the processing tasks (T4)-(T9), and the processing tasks (T4)-(T9) can run simultaneously to process data and are not step-enabled. One or more buffering tasks can be inserted to workflow input(s) and/or workflow output(s), and thus the workflow (200C) can run in the step mode or one step at a time. In an example, a buffering task (271) is provided at a workflow input (255), and a buffering task (272) is provided at a workflow output (263). In an example, the workflow (200C) runs to process data until one of the conditions is satisfied: (i) data stored in the buffering task (271) is provided to the workflow (200C) (e.g., the buffering task (271) is empty), and (ii) the buffering task (272) is full. The above description to the workflow (200C) can be suitably adapted when the workflow includes step-enabled task(s). The buffering task (271) can be an iFIFO task, a MiFIFO task, or the like. The buffering task (272) can be an iFIFO task, a MiFIFO task, or the like. In an example, a MiFIFO task is provided for the links 263-264.

Figure 2D:
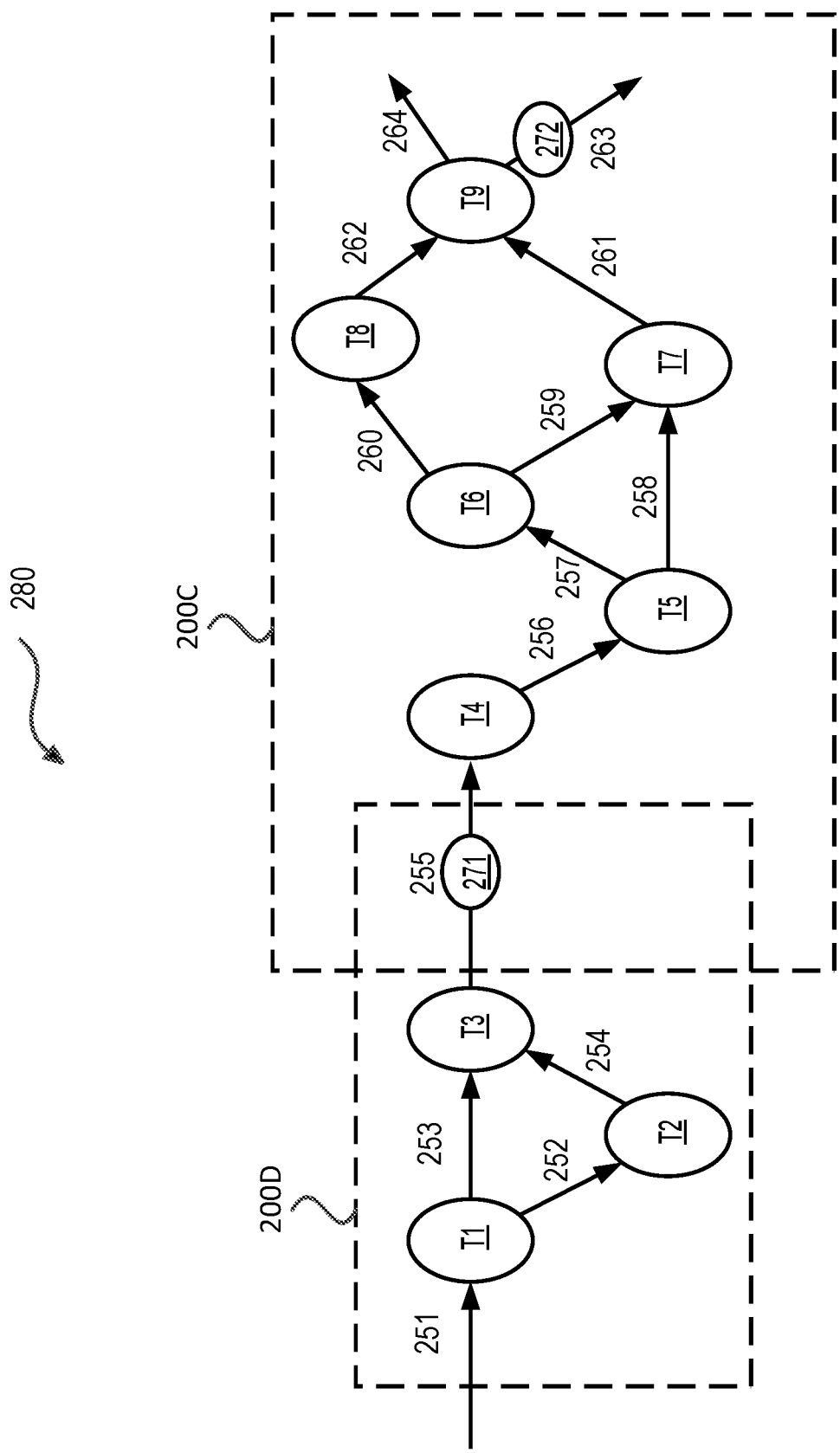
FIG. 2D shows an example of a plurality of workflows according to an embodiment of the disclosure.

FIG. 2D shows an example of a plurality of workflows (280) according to an embodiment of the disclosure. The plurality of workflows (280) can include a cascade of workflows having the workflow (200C) and a workflow (200D). The workflow (200C) is described in FIG. 2C. The workflow (200D) includes processing tasks (T1)-(T3) with a workflow input (251) providing input data to the task (T1) and a workflow output (255) providing input data to the workflow (200C). Thus, the workflow output (255) of the workflow (200D) is the workflow input (255) of the workflow (200C).

The buffering task (271) is inserted between the workflows (200C) and (200D), and thus the plurality of workflows (280) runs in the step mode where the workflow (200D) runs to process data while the workflow (200C) is in a non-running state and does not run to process data. The buffering task (271) can include an iFIFO task, a MiFIFO task, or the like.

A workflow can run in the step mode when a buffering task is provided at a workflow input or a workflow output.

According to aspects of the disclosure, a regular workflow (or a non-step-enabled workflow) including non-step-able tasks can be converted to a step-able workflow including step-able task(s) by using a simple buffering function (or buffering task). The buffering function (e.g., an iFIFO function, a MiFIFO function) or corresponding task (e.g., an iFIFO task, a MiFIFO task) can be efficient to implement in all suitable platforms. The event (e.g., the empty event, the full event, the partially full event) driven step process can simplify design and make the management of a workflow efficient. A workflow algorithm for propagating the workflow through one step per task execution is simple. The output(s) of workflow can be generated in steps. The step size can be based on the parameter S and TSDs for processing tasks in the workflow, and thus are configurable, for example, by varying the parameter S. When a processing task in the step-enabled workflow transitions from a running state to a non-running state, no state information of the processing task needs to be stored. Thus, in various examples, no state information of the processing task is a stateless step-enabled processing task and implements stateless task operation. The stateless task operation can be advantageous in certain computing platforms, such as cloud platforms.

According to aspects of the disclosure, a workflow can run in the step mode when a buffering task is provided for a workflow input, a workflow output, or between two tasks in the workflow. The workflow can run step-by-step, and thus the workflow does not run continuously to process data (e.g., media data) as the data is input to the workflow. Instead, the workflow can process a first subset of the data in a first step. After outputting the processed first subset of the data, the workflow can process a second subset of the data in a second step.

The step-by-step workflow can be achieved using any suitable method. In an example, the workflow can include buffering task(s) (e.g., iFIFO task(s), MiFIFO task(s)) provided between tasks in the workflow, as shown in FIGS. 2B and 5. One or more tasks in the workflow can run in running state(s) at a same time while other tasks are in non-running state(s), thus reducing resources (e.g., computational resources, memory resources) used in running all the tasks simultaneously.

Figure 7:
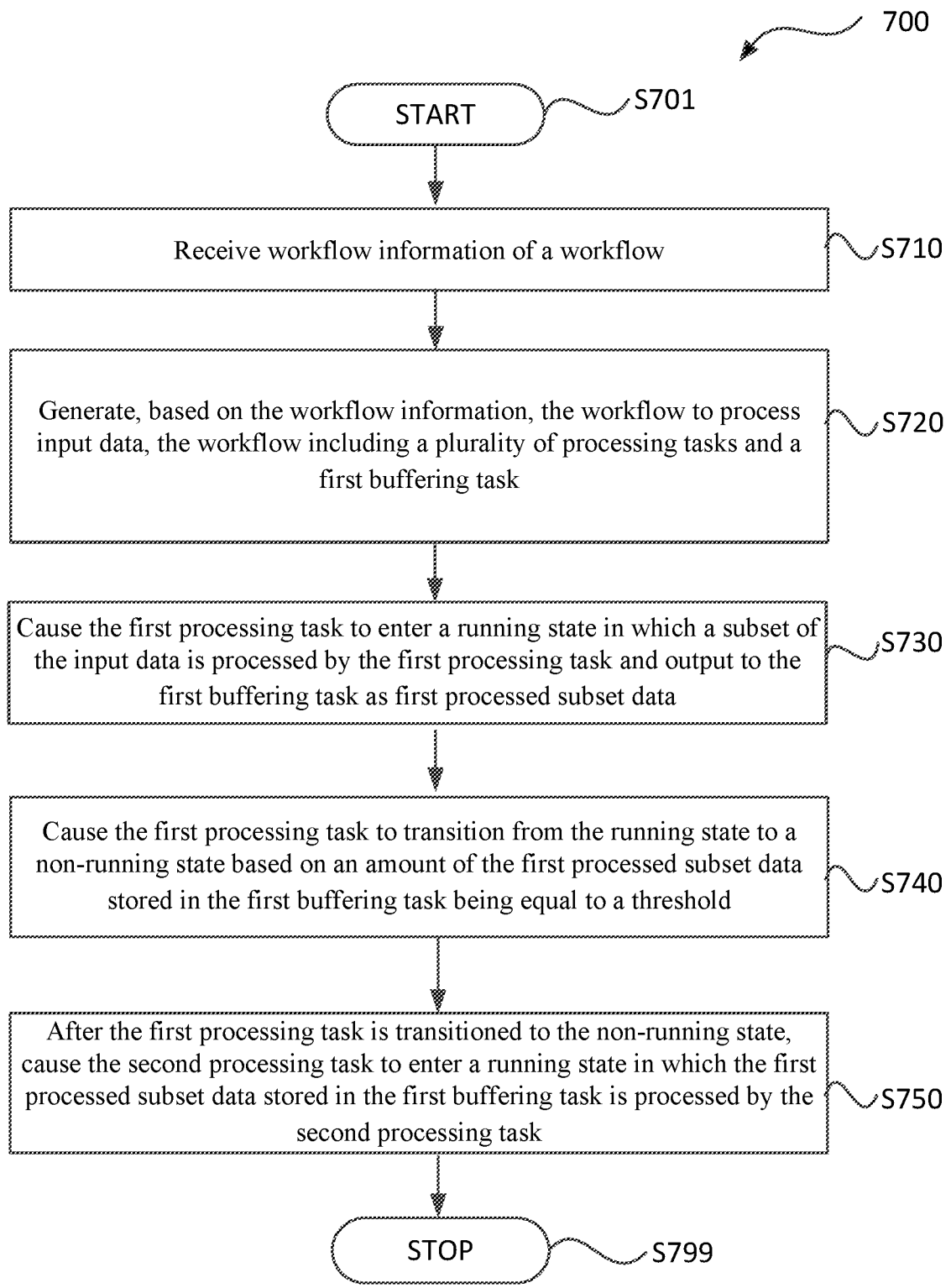
FIG. 7 shows a flow chart outlining a process according to an embodiment of the disclosure.

FIG. 7 shows a flow chart outlining a process (700) according to an embodiment of the disclosure. In an example, the process (700) is implemented using the data processing system (e.g., the NBMP system) (100) to process input data, such as media data. In some embodiments, the process (700) is implemented in software instructions, thus when the processing circuitry executes the software instructions, the processing circuitry performs the process (700). The process starts at (S701) and proceeds to (S710).

At (S710), workflow information of a workflow can be received by processing circuitry. In an example, the workflow information is received by a workflow manager (e.g., the workflow manager (103)) from a data processing source (e.g., the NBMP source (101)).

At (S720), based on the workflow information, the workflow to process input data can be generated. The workflow can include a plurality of processing tasks and a first buffering task. In an example, the plurality of processing tasks is configured with corresponding TSDs. Each of the plurality of processing tasks can be configured to process an amount of data having a size equal to the respective TSD independently from data outside the TSD. Thus, each processing task can independently process data within a time window having a duration of the TSD and an output generated by the processing task within the time window is independent on other data outside the time window. The plurality of processing tasks can include a first processing task and a second processing task. The workflow can be a step-enabled workflow, such as described in FIG. 2B or FIG. 5. The first buffering task can be instantiated from a corresponding buffering function as described above. The first buffering task can be an iFIFO task, a MiFIFO task, or the like. In an example, the input data includes a plurality of subsets of the input data having a subset of the input data.

At (S730), the first processing task can be caused to enter a running state in which the subset of the input data is processed by the first processing task and output to the first buffering task as first processed subset data. In an example, when the first processing task is in the running state to process the subset of the input data, the second processing task is in a non-running state (e.g., an idle state or a destroyed state), as described above. The first buffering task can be configured to store the first processed subset data and provide the first processed subset data to the second processing task.

At (S740), the first processing task can be caused to transition from the running state to a non-running state (e.g., an idle state or a destroyed state) based on an amount of the first processed subset data stored in the first buffering task being equal to a first threshold. In an example, state information of the first processing task is not stored in the non-running state. The first threshold can be based on (i) the TSDs of the plurality of processing tasks, (ii) the WSD of the workflow, or (iii) the WSD and the parameter S that indicates a number of steps that the first processing task is configured to run consecutively. In an example, the first threshold is S×WSD.

In an example, when the amount of the first processed subset data stored in the first buffering task is equal to the first threshold, an event (e.g., the FULL event described above) can be generated, for example, by the first buffering task and a notification can be sent to the workflow manager. Subsequently, the workflow manager can send a request to the first processing task and cause the first processing task to transition from the running state to the non-running state.

In an example, when a buffering task (referred to as an input buffering task) provides an input to the first processing task and data stored in the buffering task is provided to the first processing task, the first processing task can be caused to transition from the running state to the non-running state. For example, the buffering task can generate the empty event when the data stored in the buffering task is provided to the first processing task, and a notification can be sent to the workflow manager. Subsequently, the workflow manager can send a request to the first processing task and cause the first processing task to transition from the running state to the non-running state.

In an example, when the data stored in the input buffering task is provided to the first processing task or the amount of the first processed subset data stored in the first buffering task is equal to the first threshold, the first processing task can be caused to transition from the running state to the non-running state.

At (S750), after the first processing task is transitioned to the non-running state, the second processing task can be caused to enter a running state in which the first processed subset data stored in the first buffering task is processed by the second processing task. In an example, the first processing task is in the non-running state while the second processing task runs to process the first processed subset data. Thus, the first processing task and the second processing task do not run simultaneously, and run sequentially.

The process (700) can be suitably adapted. Step(s) in the process (700) can be modified and/or omitted. Additional step(s) can be added. Any suitable order of implementation can be used.

In an example, the second processing task that is in the running state outputs the processed first processed subset data as second processed subset data to a second buffering task. The second buffering task can be configured to store the second processed subset data and provide the second processed subset data to a third processing task in the plurality of processing tasks. After (S750), the second processing task can be caused to transition from the running state to a non-running state based on one of: (i) an amount of the second processed subset data stored in the second buffering task being equal to a second threshold and (ii) the amount of the first processed subset data stored in the first buffering task being provided to the second processing task (e.g., the buffer configured for the first buffering task is empty). In an example, state information of the second processing task is not stored in the non-running state. The second threshold can be based on (i) the TSDs of the plurality of processing tasks, (ii) the WSD of the workflow, or (iii) the WSD and the parameter S that indicates a number of steps that the first processing task is configured to run consecutively. In an example, the second threshold is S×WSD. The first and second thresholds can be identical or different.

In an example, the workflow further includes a plurality of buffering tasks that has the first buffering task (e.g., an iFIFO task or a MiFIFO). Each input of the plurality of processing tasks is from one of the input data and one or more of the plurality of buffering tasks, and only one of the plurality of the processing tasks is allowed to be in the running state at any point in time.

In an example, the input data includes the subset of the input data and another subset of the input data. The workflow includes a plurality of buffering tasks that includes the first buffering task (e.g., an iFIFO task, a MiFIFO task). Each input of the plurality of processing tasks is from one of the input data and one or more of the plurality of buffering tasks. The subset of the input data can be sequentially processed by the plurality of processing tasks. After the subset of the input data is processed by the plurality of processing tasks, the other subset of the input data can be sequentially processed by the plurality of processing tasks while remaining processing tasks in the plurality of processing tasks are in non-running states. Only one of the plurality of the processing tasks is allowed to be in the running state at any point in time.

Figure 8:
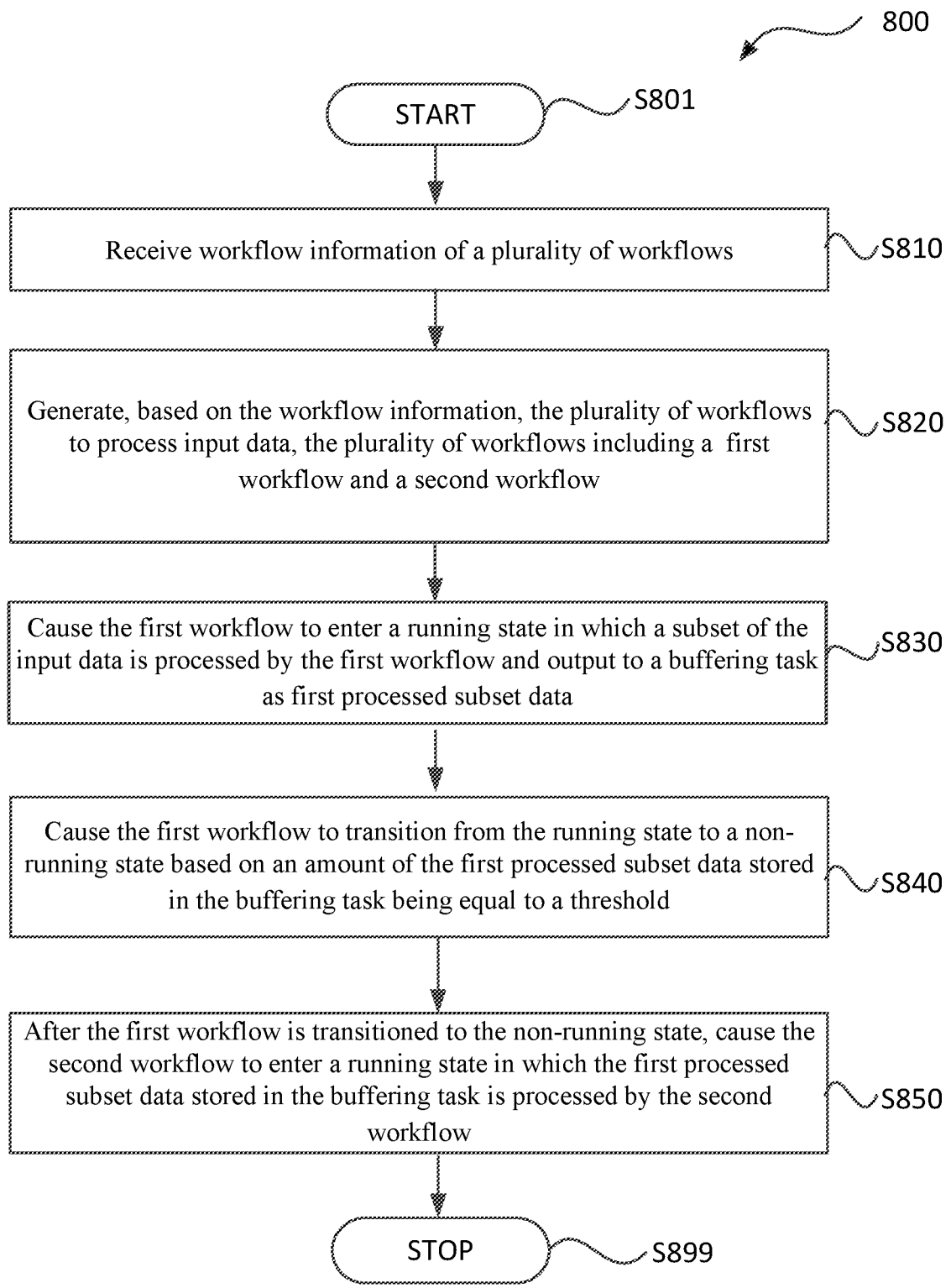
FIG. 8 shows a flow chart outlining a process according to an embodiment of the disclosure.

FIG. 8 shows a flow chart outlining a process (800) according to an embodiment of the disclosure. In an example, the process (800) is implemented using the data processing system (e.g., the NBMP system) (100) to process input data, such as media data. In some embodiments, the process (800) is implemented in software instructions, thus when the processing circuitry executes the software instructions, the processing circuitry performs the process (800). The process starts at (S801) and proceeds to (S810).

At (S810), workflow information of a plurality of workflows can be received by processing circuitry. In an example, the workflow information is received by a workflow manager (e.g., the workflow manager (103) from a data processing source (e.g., the NBMP source (101)).

At (S820), based on the workflow information, the plurality of workflows to process input data can be generated. At least one of the plurality of workflows can include a plurality of processing tasks. The plurality of workflows can include a first workflow and a second workflow. At least one of the first workflow and the second workflow has an input buffering task or an output buffering task as described above in FIG. 2C.

At (S830), the first workflow can be caused to enter a running state in which a subset of the input data is processed by the first workflow and output to a buffering task as first processed subset data. In an example, when the first workflow is in the running state to process the subset of the input data, the second workflow is in a non-running state (e.g., an idle state or a destroyed state), as described above. In an example, the buffering task can be configured to store the first processed subset data and provide the first processed subset data to to the second workflow. The buffering task can be instantiated from a corresponding buffering function as described above. The buffering task can be an iFIFO task, a MiFIFO task, or the like.

At (S840), the first workflow can be caused to transition from the running state to a non-running state based on an amount of the first processed subset data stored in the buffering task being equal to a threshold.

In an example, when the amount of the first processed subset data stored in the buffering task is equal to the threshold, an event (e.g., the FULL event described above) can be generated, for example, by the buffering task and a notification can be sent to the workflow manager. Subsequently, the workflow manager can send a request to the first workflow and cause the first workflow to transition from the running state to the non-running state.

In an example, when a buffering task (referred to as an input buffering task) provides an input to the first workflow and data stored in the input buffering task is provided to the first workflow, the first workflow can be caused to transition from the running state to the non-running state. For example, the input buffering task can generate the empty event when the data stored in the input buffering task is provided to the first workflow, and a notification can be sent to the workflow manager. Subsequently, the workflow manager can send a request to the first workflow and cause the first workflow to transition from the running state to the non-running state.

In an example, when the data stored in the input buffering task is provided to the first workflow or the amount of the first processed subset data stored in the buffering task (or the output buffering task) is equal to the threshold, the first workflow can be caused to transition from the running state to the non-running state.

At (S850), after the first workflow is transitioned to the non-running state, the second workflow can be caused to enter a running state in which the first processed subset data stored in the buffering task is processed by the second workflow. In an example, the first workflow is in the non-running state while the second workflow runs to process the first processed subset data. Thus, the first workflow and the second workflow do not run simultaneously, and run sequentially.

The process (800) can be suitably adapted. Step(s) in the process (800) can be modified and/or omitted. Additional step(s) can be added. Any suitable order of implementation can be used. In an example, the non-running state of the first workflow includes an idle state or a destroyed state. No state information of the first workflow is stored when the first workflow is in the non-running state. The first workflow is configured to process the subset of the input data independently from remaining subsets outside the subset of the input data.

The techniques described above, can be implemented as computer software using computer-readable instructions and physically stored in one or more computer-readable media.

The methods and embodiments in the disclosure may be used separately or combined in any order. Further, each of the methods (or embodiments), functions or tasks, may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
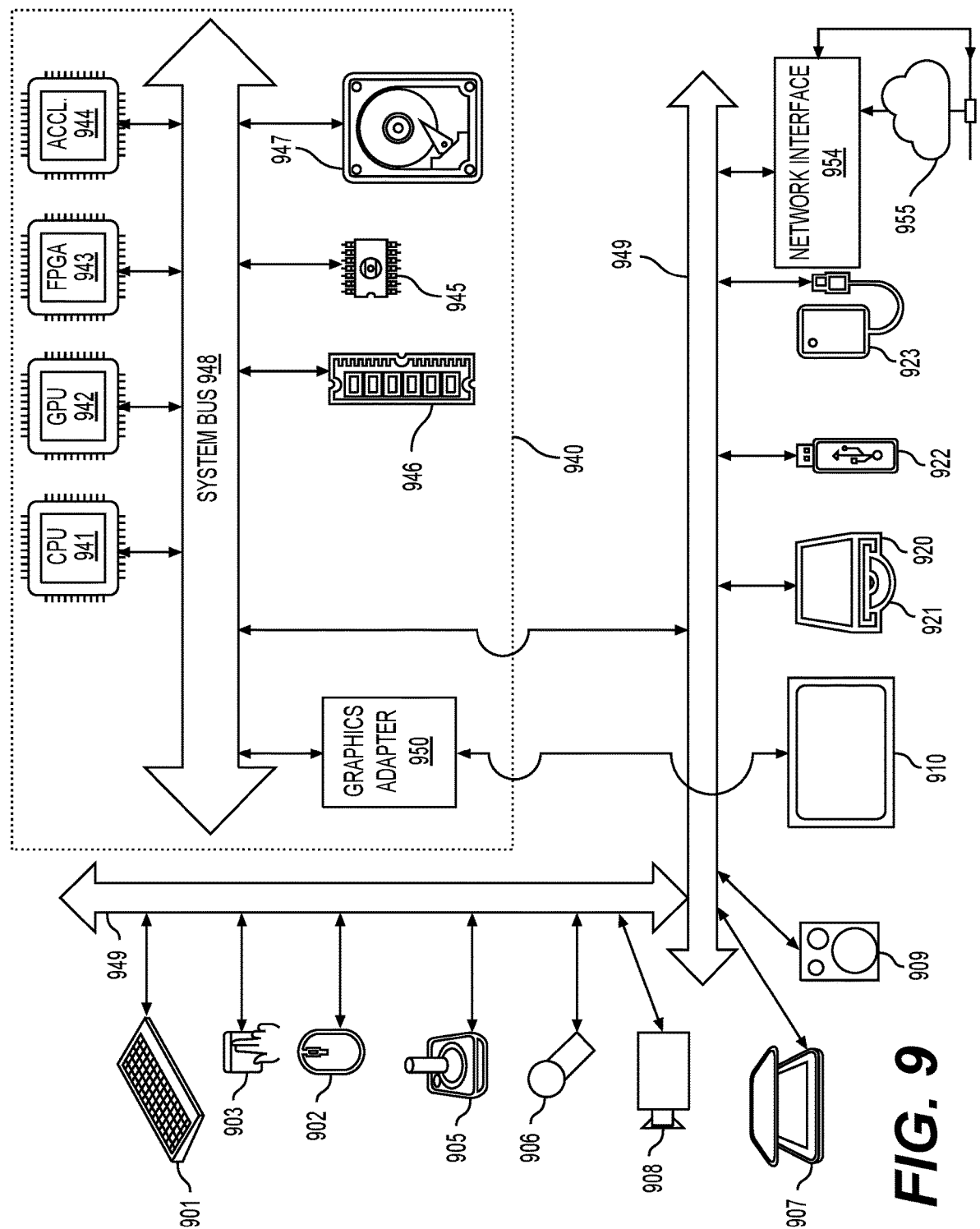
FIG. 9 shows a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing a network-based media processing (NBMP) workflow, the method comprising:
    receiving, by processing circuitry, workflow information of the NBMP workflow;
    generating, based on the workflow information, the NBMP workflow to process input data, the NBMP workflow including a plurality of media processing tasks and a first buffering task, the plurality of media processing tasks including a first media processing task and a second media processing task;
    setting the first media processing task to a running state in which a subset of the input data is processed by the first media processing task and output to the first buffering task as first processed subset data;
    setting the first media processing task from the running state to a non-running state in response to an amount of the first processed subset data stored in the first buffering task being equal to a first threshold; and
    after the first media processing task is set to the non-running state, setting the second media processing task to a running state in which the first processed subset data stored in the first buffering task is processed by the second media processing task, wherein
    no state information of the first media processing task is stored when the first media processing task is in the non-running state, the state information including the first processed subset data.

2. The method of claim 1, wherein
the second media processing task is configured to output the processed first processed subset data as second processed subset data to a second buffering task in the running state; and
the method further includes:
setting the second media processing task from the running state to a non-running state in response to one of: (i) an amount of the second processed subset data stored in the second buffering task being equal to a second threshold or (ii) the amount of the first processed subset data stored in the first buffering task being provided to the second media processing task.

3. The method of claim 1, wherein
the first buffering task is an indexed first-in-first-out (iFIFO) task configured with an iFIFO buffer; and
the iFIFO task is configured to:
store buffer segments of the input data, each buffer segment being indexed with a starting time, a duration, and a length, an iFIFO buffer size being based on the length and a number of buffer segments in the iFIFO buffer;
generate an event indicating that the amount of the first processed subset data stored in the iFIFO buffer is equal to the first threshold; and
generate another event indicating that the amount of the first processed subset data stored in the iFIFO buffer is provided to the second media processing task.

4. The method of claim 3, wherein
the NBMP workflow includes a plurality of buffering tasks that includes the iFIFO task,
each input of the plurality of media processing tasks is from one of the input data and one or more of the plurality of buffering tasks, and
only one of the plurality of media processing tasks is allowed to be in the running state at any point in time.

5. The method of claim 3, wherein
the input data includes the subset of the input data and another subset of the input data;
the NBMP workflow includes a plurality of buffering tasks that includes the iFIFO task;
each input of the plurality of media processing tasks is from one of the input data and one or more of the plurality of buffering tasks; and
the method includes
sequentially processing the subset of the input data by the plurality of media processing tasks; and
after the subset of the input data is processed by the plurality of media processing tasks, sequentially processing the other subset of the input data by the plurality of media processing tasks, remaining media processing tasks in the plurality of media processing tasks being in non-running states, and only one of the plurality of media processing tasks being allowed to be in the running state at any point in time.

6. The method of claim 1, wherein
the first buffering task is a multi-index first-in-first-out (MiFIFO) task configured with a plurality of iFIFO buffers; and
the MiFIFO task is configured to:
provide one or more outputs for the first media processing task, each of the plurality of iFIFO buffers being configured to store buffer segments of the input data from a respective one of the one or more outputs, each buffer segment being indexed with a starting time, a duration, and a length, a buffer size of each iFIFO buffer being based on the length and a number of buffer segments in the respective iFIFO buffer;
generate an event indicating that the amount of the first processed subset data stored in the MiFIFO task is equal to the first threshold; and
generate another event indicating that the amount of the first processed subset data stored in the MiFIFO task is provided to the second media processing task.

7. The method of claim 6, wherein
the NBMP workflow includes a plurality of buffering tasks that includes the MiFIFO task,
each input of the plurality of media processing tasks is from one of the input data and one or more of the plurality of buffering tasks, and
only one of the plurality of media processing tasks is allowed to be in the running state at any point in time.

8. The method of claim 6, wherein
the input data includes the subset of the input data and another subset of the input data;
the NBMP workflow includes a plurality of buffering tasks that includes the MiFIFO task;
each input of the plurality of media processing tasks is from one of the input data and one or more of the plurality of buffering tasks; and
the method includes
sequentially processing the subset of the input data by the plurality of media processing tasks; and
after the subset of the input data is processed by the plurality of media processing tasks, sequentially processing the other subset of the input data by the plurality of media processing tasks, remaining media processing tasks in the plurality of media processing tasks being in non-running states, and only one of the plurality of media processing tasks being allowed to be in the running state at any point in time.

9. The method of claim 1, wherein the non-running state includes one of an idle state and a destroyed state.

10. The method of claim 1, wherein:
each of the plurality of media processing tasks is associated with a respective task segment duration (TSD) and is configured to process an amount of data associated with the respective TSD independently from other data,
the first threshold is based on TSDs associated with the plurality of media processing tasks,
each of the TSDs indicates one of a respective a duration in a time domain and a respective length of data, and
the amount of data that is processed by each of the plurality of media processing tasks has a size equal to the respective TSD.

11. A method for processing a plurality of NBMP workflows, the method comprising:
receiving, by processing circuitry, workflow information of the plurality of NBMP workflows;
generating, based on the workflow information, the plurality of NBMP workflows to process input data, at least one of the plurality of NBMP workflows including a plurality of media processing tasks, the plurality of NBMP workflows including a first NBMP workflow and a second NBMP workflow;
setting the first NBMP workflow to a running state in which a subset of the input data is processed by the first NBMP workflow and output to a buffering task as first processed subset data;
setting the first NBMP workflow to a non-running state from the running state in response to an amount of the first processed subset data stored in the buffering task being equal to a threshold, the buffering task including one of an iFIFO task configured with an iFIFO buffer or a multi-index first-in-first-out (MiFIFO) task configured with a plurality of iFIFO buffers; and after the first NBMP workflow is set to the non-running state, setting the second NBMP workflow to a running state in which the first processed subset data stored in the buffering task is processed by the second NBMP workflow, wherein no state information of the first NBMP workflow is stored when the first NBMP workflow is in the non-running state; and the first NBMP workflow is configured to process the subset of the input data independently from remaining subsets outside the subset of the input data.

12. The method of claim 11, wherein the non-running state of the first NBMP workflow includes one of an idle state and a destroyed state.

13. The method of claim 11, wherein the first NBMP workflow includes an input buffering task, and the method further includes setting the first NBMP workflow to the non-running state from the running state after an empty event is generated by the input buffering task.

14. An apparatus for processing a network-based media processing (NBMP) workflow, the apparatus comprising:
processing circuitry configured to:
receive workflow information of the NBMP workflow;
generate, based on the workflow information, the NBMP workflow to process input data, the NBMP workflow including a plurality of media processing tasks and a first buffering task, the plurality of media processing tasks including a first media processing task and a second media processing task;
set the first media processing task to a running state in which a subset of the input data is processed by the first media processing task and output to the first buffering task as first processed subset data;
set the first media processing task from the running state to a non-running state in response to an amount of the first processed subset data stored in the first buffering task being equal to a first threshold; and
after the first media processing task is set to the non-running state, set the second media processing task to a running state in which the first processed subset data stored in the first buffering task is processed by the second media processing task, wherein
no state information of the first media processing task is stored when the first media processing task is in the non-running state, the state information including the first processed subset data.

15. The apparatus of claim 14, wherein the second media processing task is configured to output the processed first processed subset data as second processed subset data to a second buffering task in the running state; and the processing circuitry is configured to set the second media processing task from the running state to a non-running state in response to one of: (i) an amount of the second processed subset data stored in the second buffering task being equal to a second threshold or (ii) the amount of the first processed subset data stored in the first buffering task being provided to the second media processing task.

16. The apparatus of claim 14, wherein the first buffering task is an indexed first-in-first-out (iFIFO) task configured with an iFIFO buffer; and the iFIFO task is configured to:
store buffer segments of the input data, each buffer segment being indexed with a starting time, a duration, and a length, an iFIFO buffer size being based on the length and a number of buffer segments in the iFIFO buffer;
generate an event indicating that the amount of the first processed subset data stored in the iFIFO buffer is equal to the first threshold; and
generate another event indicating that the amount of the first processed subset data stored in the iFIFO buffer is provided to the second media processing task.

17. The apparatus of claim 16, wherein the NBMP workflow includes a plurality of buffering tasks that includes the iFIFO task, each input of the plurality of media processing tasks is from one of the input data and one or more of the plurality of buffering tasks, and only one of the plurality of media processing tasks is allowed to be in the running state at any point in time.

18. The apparatus of claim 14, wherein the first buffering task is a multi-index first-in-first-out (MiFIFO) task configured with a plurality of iFIFO buffers; and the MiFIFO task is configured to:
provide one or more outputs for the first media processing task, each of the plurality of iFIFO buffers being configured to store buffer segments of the input data from a respective one of the one or more outputs, each buffer segment being indexed with a starting time, a duration, and a length, a buffer size of each iFIFO buffer being based on the length and a number of buffer segments in the respective iFIFO buffer;
generate an event indicating that the amount of the first processed subset data stored in the MiFIFO task is equal to the first threshold; and
generate another event indicating that the amount of the first processed subset data stored in the MiFIFO task is provided to the second media processing task.

19. The apparatus of claim 14, wherein the non-running state includes one of an idle state and a destroyed state.

20. The apparatus of claim 14, wherein each of the plurality of media processing tasks is associated with a respective task segment duration (TSD) and is configured to process an amount of data associated with the respective TSD independently from other data, the first threshold is based on TSDs associated with the plurality of media processing tasks, each of the TSDs indicates one of a respective a duration in a time domain and a respective length of data, and the amount of data that is processed by each of the plurality of media processing tasks has a size equal to the respective TSD.

* * * * *